United States Patent
Teyeb et al.

(10) Patent No.: US 11,937,113 B2
(45) Date of Patent: Mar. 19, 2024

(54) FLEXIBLE EARLY MEASUREMENT REPORTING

(71) Applicant: Telefonaktiebolaget LM Ericsson (publ), Stockholm (SE)

(72) Inventors: Oumer Teyeb, Solna (SE); Icaro Leonardo Da Silva, Solna (SE); Jens Bergqvist, Linköping (SE); Patrik Rugeland, Stockholm (SE); Antonino Orsino, Kirkkonummi (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 259 days.

(21) Appl. No.: 17/440,311

(22) PCT Filed: Mar. 13, 2020

(86) PCT No.: PCT/SE2020/050267
§ 371 (c)(1),
(2) Date: Sep. 17, 2021

(87) PCT Pub. No.: WO2020/190197
PCT Pub. Date: Sep. 24, 2020

(65) Prior Publication Data
US 2022/0150741 A1 May 12, 2022

Related U.S. Application Data

(60) Provisional application No. 62/821,184, filed on Mar. 20, 2019.

(51) Int. Cl.
*H04W 24/10* (2009.01)
*H04W 76/27* (2018.01)
(52) U.S. Cl.
CPC .......... *H04W 24/10* (2013.01); *H04W 76/27* (2018.02)

(58) Field of Classification Search
CPC . H04W 76/27; H04W 52/0229; H04W 76/19; H04W 52/0212; H04L 5/001; Y02D 30/70
See application file for complete search history.

(56) References Cited

U.S. PATENT DOCUMENTS

2011/0183661 A1* 7/2011 Yi .................. H04W 24/10
455/422.1
2017/0331670 A1 11/2017 Parkvall et al.
(Continued)

OTHER PUBLICATIONS

International Search Report and Written Opinion dated Jun. 22, 2020 for International Application No. PCT/SE2020/050267 filed Mar. 13, 2020, consisting of 9-pages.
(Continued)

*Primary Examiner* — Ayaz R Sheikh
*Assistant Examiner* — Tarell A Hampton
(74) *Attorney, Agent, or Firm* — Christopher & Weisberg, P.A.

(57) ABSTRACT

Systems and methods are disclosed herein that provide reporting of early measurements in a cellular communications system. Embodiments of a method performed by a wireless device are disclosed. Early measurements are also referred to herein as dormant mode measurements. In some embodiments, a method performed by a wireless device includes performing one or more dormant mode measurements, where the one or more dormant mode measurements are one or more measurements performed by the wireless device while the wireless device is in a dormant mode. The method further includes storing the one or more dormant mode measurements, identifying a reporting scheme to be used by the wireless device to report dormant mode measurements, and reporting at least one of the stored dormant mode measurements in accordance with the identified
(Continued)

reporting scheme. Corresponding embodiments of a wireless device are also disclosed.

4 Claims, 13 Drawing Sheets

(56) References Cited

U.S. PATENT DOCUMENTS

| | | | | |
|---|---|---|---|---|
| 2019/0014492 | A1* | 1/2019 | Kim | H04W 76/27 |
| 2019/0159053 | A1* | 5/2019 | Tsuda | H04B 17/382 |
| 2020/0178107 | A1* | 6/2020 | Miao | H04W 24/08 |
| 2020/0229130 | A1* | 7/2020 | Keating | H04W 52/0229 |
| 2021/0067999 | A1* | 3/2021 | Yang | H04W 74/08 |
| 2021/0219163 | A1* | 7/2021 | Sha | H04W 24/04 |
| 2021/0345151 | A1* | 11/2021 | Chen | H04W 68/005 |

OTHER PUBLICATIONS

3GPP TS 36.331 V15.7.0; 3rd Generation Partnership Project; Technical Specification Group Radio Access Network; Evolved universal Terrestrial Radio Access (E-UTRA); Radio Resource Control (RRC); Protocol specification (Release 15), Sep. 2019, consisting of 962-pages.
3GPP TSG-RAN WG2 Meeting #105 R2-1901612; Title: Early measurement configuration/reporting in LTE and NR RRC_IDLE; Agenda Item: 11.10.3; Source: Huawei, HiSilicon; Document for: Discussion and Decision; Date and Location: Feb. 25-Mar. 1, 2019, Athens, Greece, consisting of 3-pages.
3GPP TSG-RAN WG2 Meeting #105 R2-1902014; Title: Fast setup MR-DC and NR CA with early measurement reporting; Agenda Item: 11.10.3; Source: LG Electronics Inc.; Document for: Discussion and Decision; Date and Location: Feb. 25-Mar. 1, 2019, Athens, Greece, consisting of 4-pages.
3GPP TSG-RAN WG2 #105 meeting Tdoc R2-1902218; Title: Non-connected measurements, defining initial baseline; Agenda Item: 11.10.3; Source: Samsung; Document for: Discussion and decision; Date and Location: Feb. 25-Mar. 1, 2019, Athens, Greece, consisting of 3-pages.
3GPP TS 38.331 V15.4.0; 3rd Generation Partnership Project; Technical Specification Group Radio Access Network; NR; Radio Resource Control (RRC) protocol specification (Release 15), Dec. 2018, consisting of 474-pages.
3GPP TS 36.133 V15.4.0; 3rd Generation Partnership Project; Technical Specification Group Radio Access Network; Evolved universal Terrestrial Radio Access (E-UTRA); Requirements for support of radio resource management (Release 15), Sep. 2019, consisting of 3227-pages.
3GPP TS 23.401 V15.6.0; 3rd Generation Partnership Project; Technical Specification Group Services and System Aspects; General Packet Radio Service (GPRS) enhancements for Evolved Universal Terrestrial Radio Access Network (E-UTRAN) access (Release 15), Dec. 2018, consisting of 411-pages.
International Written Opinion dated May 7, 2021 for International Application No. PCT/SE2020/050267 filed Mar. 13, 2020, consisting of 17-pages.
3GPP TSG-RAN WG2 #105 R2-1901613; Title: Early measurement configuration/reporting in LTE and NR; Agenda Item: 11.10.3; Source: Huawei, HiSilicon; Document for: Discussion and decision; Date and Location: Feb. 25-Mar. 1, 2019, Athens, Greece, consisting of 3-pages.
3GPP TSG RAN WG2 #105 R2-1900104; Title: Supporting early measurement reporting in NR; Agenda Item: 11.10.3; Source: Qualcomm Incorporated; WID/SID: LTE_NR_DC_CA_enh-Core-Release 16; Document for: Discussion and Decision; Date and Location: Feb. 25-Mar. 1, 2019, Athens, Greece, consisting of 6-pages.
Indian Office Action dated Mar. 14, 2022 for Patent Application No. 202147046696, consisting of 5-pages.

* cited by examiner

NOTE: THE ACTION OF MOVING TO DORMANT IS CALLED "HYBERNATION"

*3GPP Scenarios, LTE and NR Interworking Options*

FLEXIBLE EARLY MEASUREMENT REPORTING

CROSS-REFERENCE TO RELATED APPLICATIONS

This application is a submission Under 35 U.S.C. § 371 for U.S. National Stage Patent Application of International Application No.: PCT/SE2020/050267, filed Mar. 13, 2020 entitled "FLEXIBLE EARLY MEASUREMENT REPORTING," which claims priority to U. S. Provisional Application No.: 62/821,184, filed Mar. 20, 2019, the entireties of both of which are incorporated herein by reference.

TECHNICAL FIELD

The present disclosure relates to early measurement reporting in a cellular communications system.

BACKGROUND

I. Carrier Aggregation (CA) and Dual Connectivity (DC) in Long Term Evolution (LTE)

In Release 10, CA was introduced in LTE to enable the User Equipment (UE) to transmit and/or receive information via multiple cells (so called Secondary Cells—SCell(s)) from multiple carrier frequencies to benefit from the existence of non-contiguous and contiguous carriers. In CA terminology, the Primary Cell (PCell) is the cell towards which the UE establishes the Radio Resource Control (RRC) connection or performs handover. In CA, cells are aggregated on Medium Access Control (MAC) level. MAC gets grants for a certain cell and multiplexes data from different bearers to one transport block being sent on that cell. Also, MAC controls how that process is done. This is illustrated in FIG. 1.

SCells can be "added" (a.k.a. "configured") for the UE using RRC signaling (e.g., RRCConnectionReconfiguration), which takes on the order of hundreds of milliseconds. A cell which is configured for the UE becomes a "serving cell" for this UE. An SCell may also be associated with an SCell state. When configured/added via RRC, an SCell starts in deactivated state. In LTE Release 15, the enhanced or evolved Node B (eNB) can indicate to activate-upon-configuration, or change the state, at least in RRCReconfiguration, as shown below (from Third Generation Partnership Project (3GPP) Technical Specification (TS) 36.331 V15.3.0):

```
1> for each SCell configured for the UE other than the PSCell:
2>   if the received RRCConnectionReconfiguratin message includes sCellState
     for the SCell and indicates activated:
   3> configure lower layers to consider the SCell to be in activated state;
2>   else if the received RRCConnectionReconfiguration message includes
     sCellState for the SCell and indicates dormant
   3> configure lower layers to consider the SCell to be in dormant state;
2>   else:
   3> configure lower layers to consider the SCell to be in deactivated state;
```

In LTE Release 15, a new intermediate state between the deactivated and an active state has been introduced for enhanced uplink operation. A MAC Control Element (CE) can be used to change the SCell state between the three states as shown in FIG. 2. There are also timers in MAC to move a cell between deactivated/activated/dormant. These timers are:

sCellHibernationTimer, which moves the SCell from activated state to dormant state, sCellDeactivationTimer, which moves the SCell from activated state to deactivated state, and dormantSCellDeactivationTimer, which moves the SCell from dormant state to deactivated state.

The MAC level SCell activation takes in the order of 20-30 milliseconds (ms).

Once the network understands the need to configure and/or activate CA, the question is which cells to initially configure and/or activate, if they are configured, and/or whether a cell/carrier is good enough in terms of radio quality/coverage (e.g., Reference Signal Received Power (RSRP) and Reference Signal Received Quality (RSRQ)). To understand the conditions on SCell(s) or potential SCell(s) in a given available carrier, the network may configure the UE to perform Radio Resource Management (RRM) measurements.

Typically, the network may be assisted by RRM measurements to be reported by a UE. The network may configure the UE with measurement identities (IDs) associated to reportConfig with event A1 (serving cell becomes better than threshold) in case this is a configured SCell, or A4 (neighbor cell becomes better than threshold) for carriers without a configured SCell. The measurement objects are associated to the carrier the network wants reports on. If the network is aware of the exact cells it wants the UE to measure, a so-called white cell list can be configured in the measurement object so that the UE is only required to measure these cells in that carrier.

FIG. 3 illustrates a process in which the network decides to setup CA or DC for a UE. The network then configures the UE to perform measurements, and the UE sends the appropriate measurement reports to the network. Based on the received measurement reports, the network makes a decision on SCell addition or SCell activation and then configures the UE to add the selected SCell(s).

With the introduction of DC in Release 12, it was possible to add what is called Secondary Cell Group (SGC) configuration to the UE. The main benefit would be that the UE could in principle add a cell from another eNB. Protocol-wise, that would require different MAC entities, one for each cell group. The UE will have two cell groups, one associated to the PCell (master node) and another associated to a Primary Secondary Cell (PSCell) (of the secondary eNB), where each group may possibly have their own associated SCells.

When it comes to adding SCells, when the UE is in single connectivity, the RRCConnectionReconfiguration message may carry a cell index (so MAC identifiers are optimized, i.e., shorter), cell identifier and carrier frequency, common parameters, and state information, introduced in Release 15 (activated or dormant).

Below the SCellToAddModList included in the RRCConnectionReconfiguration is illustrated and described.

```
SCellToAddModList-r10 ::=            SEQUENCE (SIZE(1..maxSCell-r10)) OF
SCellToAddMod-r10
SCellToAddMod-r10 ::=                SEQUENCE {
  sCellIndex-r10                       SCellIndex-r10,
  cellIdentification-r10               SEQUENCE {
    physCellId-r10                       PhysCellId,
    dl-CarrierFreq-r10                   ARFCN-ValueEUTRA
  }                                      OPTIONAL, -- Cond
SCellAdd
  radioResourceConfigCommonSCell-r10       RadioResourceConfigCommonSCell-r10
  OPTIONAL, -- Cond SCellAdd
  radioResourceConfigDedicatedSCell-r10  RadioResourceConfigDedicatedSCell-r10
  OPTIONAL, -- CondSCellAdd2
  ...,
  [[ dl-CarrierFreq-v1090            ARFCN-ValueEUTRA-v9e0    OPTIONAL-- Cond
EARFCN-max
  ]],
  [[ antennaInfoDedicatedSCell-v10i0     AntennaInfoDedicated-v10i0    OPTIONAL-- NeedON
  ]],
  [[ srs-SwitchFromServCellIndex-r14     INTEGER (0.. 31)      OPTIONAL -- NeedON
  ]],
  [[ sCellState-r15                  ENUMERATED {activated, dormant}    OPTIONAL
  -- Need ON
  ]]
}
```

II. Inter-Radio Access Technology (RAT) and Inter Fifth Generation (5G) Core (5GC) Interworking in LTE and New Radio (NR)

5G in 3GPP introduces both a new core network, which is referred to as the 5GC, and a new Radio Access Network (RAN), which is referred to as NR. The 5GC will, however, also support RATs other than NR. It has been agreed that LTE (or Evolved Universal Terrestrial Radio Access (E-UTRA)) should also be connected to 5GC. LTE base stations (eNBs) that are connected to 5GC are called ng-eNBs and are part of Next Generation Radio Access Network (NG-RAN), which also includes NR base stations called gNBs. FIG. 4 shows how the base stations are connected to each other and the nodes in 5GC. In particular, FIG. 4 is the 5G System (5GS) architecture containing 5GC and NG-RAN.

There are different ways to deploy a 5G network with or without interworking with LTE (also referred to as E-UTRA) and Evolved Packet Core (EPC), as depicted in FIG. 5. In principle, NR and LTE can be deployed without any interworking, denoted by NR Stand-Alone (SA) operation, that is the gNB in NR can be connected to 5GC and the eNB can be connected to EPC with no interconnection between the two (Option 1 and Option 2 in FIG. 5). On the other hand, the first supported version of NR is the so-called Evolved Universal Terrestrial Radio Access Network (E-UTRAN) NR DC (EN-DC), illustrated by Option 3 in FIG. 5. In such a deployment, DC between NR and LTE is applied with LTE as the master and NR as the secondary node. The RAN node (gNB) supporting NR may not have a control plane connection to the core network (EPC); instead, the gNB relies on the LTE as master node (Master eNB (MeNB)). This is also called "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, Option 2 in FIG. 5 supports SA NR deployment where the gNB is connected to 5GC. Similarly, LTE can also be connected to 5GC using Option 5 (also known as enhanced LTE (eLTE), E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that Option 4 and Option 7 of FIG. 5 are other variants of DC between LTE and NR which will be standardized as part of NG-RAN connected to 5GC, denoted by Multi-Radio DC (MR-DC). Under the MR-DC umbrella, we have:

EN-DC (Option 3): LTE is the master node and NR is the secondary node (EPC Core Network (CN) employed)
NR E-UTRA (NE)-DC (Option 4): NR is the master node and LTE is the secondary node (5GC employed)
NGEN-DC (Option 7): LTE is the master node and NR is the secondary node (5GC employed)
NR-DC (variant of Option 2): DC where both the master and secondary nodes are NR (5GC employed).

As migration for these options may differ from different operators, it is possible to have deployments with multiple options in parallel in the same network, e.g. there could be an eNB base station supporting Options 3, 5, and 7 in the same network as a NR base station supporting Options 2 and 4. In combination with DC solutions between LTE and NR, it is also possible to support CA in each cell group (i.e., Master Cell Group (MCG) and SCG) and DC between nodes on the same RAT (e.g., NR-NR DC). For the LTE cells, a consequence of these different deployments is the coexistence of LTE cells associated to eNBs connected to EPC, 5GC, or both EPC/5GC.

III. Suspend/Resume in LTE and Relation to CA/SCell and SCG Additions

A very typical scenario or use case is a UE with some burst traffic that comes and goes, e.g. some video packets and idle periods of transmission/reception, then comes live again. To save UE power, the network transitions the UE from connected to idle during these periods. Then, the UE comes back again (either via paging or UE request to get connected) and accesses the network.

In LTE Release 13, a mechanism was introduced for the UE to be suspended by the network in a suspended state similar to RRC_IDLE but with the difference that the UE stores the Access Stratum (AS) context or RRC context. This makes it possible to reduce the signaling when the UE is becoming active again by resuming the RRC connection, instead of as prior to establish the RRC connection from scratch. Reducing the signaling could have several benefits:

Reduce latency, e.g., for smart phones accessing the Internet

Reduced signaling leads to reduced battery consumption for machine type devices sending very little data.

The Release 13 solution is based on the UE sending a RRCConnectionResumeRequest message to the network and, in response, the UE may receive an RRCConnection-Resume from the network. The RRCConnectionResume is not encrypted but integrity protected.

The resume procedure in LTE can be found in the RRC specifications (TS 36.331). As the UE performing resume is in RRC_IDLE (with suspended AS context), a transition from RRC_IDLE to RRC_CONNECTED is triggered. Hence, this is modelled in the specifications in the same subclause that captures the RRC connection establishment (subclause 5.3.3 RRC connection establishment).

There are few things relevant to highlight in the SCG configurations and SCell configurations for MCGs in relation to suspend/resume procedures. Upon suspension, it is defined that the UE stores its used RRC configuration. In other words, if the UE is operating in any DC mode (and has an SCG configuration) or has just configured SCells in the MCG, the UE stores all these configurations. However, upon resume, at least until Release 15, it is defined that the UE shall release the SCG configurations and SCell configurations, as shown below:

---

5.3.3.2 Initiation
The UE initiates the procedure when upper layers request establishment or resume of an RRC connection while the UE is in RRC_IDLE or when upper layers request resume of an RRC connection or RRC layer requests resume of an RRC connection for, e.g. RNAU or reception of RAN paging while the UE is in RRC_INACTIVE.
. . .
Except for NB-IoT, upon initiating the procedure, if connected to EPC or 5GC, the UE shall:
    1>   if the UE is resuming an RRC connection from a suspended RRC connection or from RRC_INACTIVE:
        2>       if the UE is resuming an RRC connection from a suspended RRC connection:
            3>     if the UE was configured with EN-DC:
                4>   perform EN-DC release, as specified in TS 38.331 [82], clause 5.3.5.10;
        2>       release the MCG SCell(s), if configured, in accordance with 5.3.10.3a;
. . .
        2>       release the entire SCG configuration, if configured, except for the DRB configuration (as configured by drb-ToAddModListSCG);

---

Hence, when the UE comes from RRC_IDLE with the context, if the network wants to add SCell(s) to the MCG or add an SCG, the network needs to do that from scratch, even if the UE is suspending and resuming in the same cell/area where all the previous PCell and SCell configurations are still valid from a radio conditions perspective.

As the use case of UEs with burst traffic constantly being suspended and resuming in the same cell is quite typical, 3GPP has standardized a solution in LTE to enable the UE to assist the network with measurements performed while the UE is in RRC_IDLE so that the network could speed up the setup of CA or DC. That solution is described below.

IV. Existing Solution for Early Measurements upon Idle to Connected Transition in LTE (Release 15)

In LTE Release 15, it is possible to configure the UE to report so-called early measurements upon the transition from idle to connected state. These measurements are measurements that the UE can perform in idle state, and according to a configuration provided by the source cell with the intention to receive these measurements immediately after the UE is connected and quickly sets up CA and/or other forms of DC (e.g., EN-DC, MR-DC, etc.) without the need to first provide a measurement configuration (measConfig) in RRC_CONNECTED, as shown in previous sections, and waits for hundreds of milliseconds until first samples are collected, monitored, and then the first reports are triggered and transmitted to the network.

A. Measurement Configuration for Early Measurements Upon Resume in LTE

A first aspect of the existing solution, as standardized in E-UTRA 36.331, is described in 5.6.20 Idle Mode Measurements. The UE can receive these idle mode measurement configurations in the system information (System Information Block 5 (SIB5)) in the field MeasIdleConfigSIB-r15, indicating up to 8 cells or ranges of cell IDs on which to perform measurements. In addition, the UE can be configured upon the transition from RRC_CONNECTED to RRC_IDLE with a dedicated measurement configuration in the RRCConnectionRelease message with the measIdleDedicated-r15 which overrides the broadcasted configurations in SIB5. The broadcasted and dedicated signaling is shown below:

| RRCConnectionRelease message |
| --- |

```
-- ASN1START
RRCConnectionRelease ::=            SEQUENCE {
    rrc-TransactionIdentifier       RRC-TransactionIdentifier,
    criticalExtensions              CHOICE {
        c1                              CHOICE {
            rrcConnectionRelease-r8         RRCConnectionRelease-r8-IEs,
            spare3 NULL, spare2 NULL, spare1 NULL
        },
        criticalExtensionsFuture        SEQUENCE {}
    }
}
-- other info has been omitted
RRCConnectionRelease-v1530-IEs ::=  SEQUENCE {
    drb-ContinueROHC-r15            ENUMERATED {true}       OPTIONAL,
-- Cond UP-EDT
    nextHopChainingCount-r15        NextHopChainingCount    OPTIONAL,
-- Cond UP-EDT
    measIdleConfig-r15              MeasIdleConfigDedicated-r15
    OPTIONAL, -- Need ON
    rrc-InactiveConfig-r15          RRC-InactiveConfig-r15   OPTIONAL,
-- Need OR
    cn-Type-r15                     ENUMERATED {epc,fivegc}  OPTIONAL,
-- Need OR
    nonCriticalExtension            SEQUENCE {}    OPTIONAL
}
-- ASN1STOP
```

| MeasIdleConfig information element |
| --- |

```
-- ASN1START
MeasIdleConfigSIB-r15 ::= SEQUENCE {
    measIdleCarrierListEUTRA-r15 EUTRA-CarrierList-r15,
    ...
}
MeasIdleConfigDedicated-r15 ::= SEQUENCE {
    measIdleCarrierListEUTRA-r15    EUTRA-CarrierList-r15   OPTIONAL,
-- Need OR
    measIdleDuration-r15            ENUMERATED {sec10, sec30, sec60, sec120,
                                        sec180, sec 240, sec300, spare},
    ...
}
EUTRA-CarrierList-r15 ::=SEQUENCE (SIZE (1..maxFreqIdle-r15)) OF
MeasIdleCarrierEUTRA-r15
MeasIdleCarrierEUTRA-r15::=      SEQUENCE {
    carrierFreq-r15                 ARFCN-ValueEUTRA-r9,
    allowedMeasBandwidth-r15            AllowedMeasBandwidth,
    validityArea-r15                CellList-r15    OPTIONAL,
-- Need OR
    measCellList-r15                CellList-r15    OPTIONAL,
-- Need OR
    reportQuantities                ENUMERATED {rsrp, rsrq, both},
    qualityThreshold-r15            SEQUENCE {
        idleRSRP-Threshold-r15          RSRP-Range
    OPTIONAL, -- Need OR
        idleRSRQ-Threshold-r15          RSRQ-Range-r13
    OPTIONAL -- Need OR
    }                               OPTIONAL, -- Need
OR
    ...
}
CellList-r15 ::=     SEQUENCE (SIZE (1.. maxCellMeasIdle-r15)) OF PhysCellIdRange
```

MeasIdleConfig field descriptions allowedMeasBandwidth
If absent, the value corresponding to the downlink bandwidth indicated by the dl-Bandwidth included in MasterInformationBlock of serving cell applies.
carrierFreq
Indicates the E-UTRA carrier frequency to be used for measurements during IDLE mode.
measIdleCarrierListEUTRA
Indicates the E-UTRA carriers to be measured during IDLE mode.
measIdleDuration
Indicates the duration for performing measurements during IDLE mode for measurements assigned via RRCConnectionRelease. Value sec10 correspond to 10 seconds, value sec30 to 30 seconds and so on.
qualityThreshold
Indicates the quality thresholds for reporting the measured cells for IDLE mode measurements.
reportQuantities
Indicates which measurement quantities UE is requested to report in the IDLE mode measurement report.
measCellList

| MeasIdleConfig field descriptions |
| --- |
| Indicates the list of cells which the UE is requested to measure and report for IDLE mode measurements. |
| validityArea |
| Indicates the list of cells within which UE is requested to do IDLE mode measurements. If the UE reselects to a cell outside this list, the measurements are no longer required. |

Carrier information and cell list: The UE is provided with a list of carriers and optionally with a list of cells on which the UE shall perform measurements. The fields s-NonIntraSearch in SystemInformationBlockType3 do not affect the UE measurement procedures in IDLE mode.

Timer T331: Upon the reception of that measurement configuration, the UE starts a timer T331 with the value provided in measIdleDuration, which can go from 0 to 300 seconds. The timer stops upon receiving RRCConnectionSetup, RRCConnectionResume which indicates a transition to RRC_CONNECTED. That concept exists to limit the amount of time the UE performs measurements for the purpose of early measurements.

Validity Area: Another concept introduced in the LTE Release 15 solution is a validity area, which comprises a list of Physical Cell Identities (PCIs). The intention is to limit the area where CA or DC may be setup later when the UE resumes/setups the connection, so the early measurements are somewhat useful for that purpose. If validityArea is configured, and the UE reselects to a serving cell whose PCI does not match any entry in validityArea for the corresponding carrier frequency, the timer T331 is stopped. Then, the UE stops to perform IDLE measurements and releases the configuration (i.e., VarMeasIdleConfig). Notice that this does not necessarily imply that the UE releases the idle measurements that were configured in Release and that were performed, i.e. these may still be stored and possibly requested by the network. In addition, the UE may continue with IDLE mode measurements according to the broadcasted SIB5 configuration after the timer T331 has expired or stopped.

Minimum quality threshold: Notice also that only measurements above a certain threshold shall be stored as the cell candidates for CA setup need to be within a minimum acceptable threshold. How the UE performs measurements in IDLE mode is up to UE implementation as long as RAN4 requirements for measurement reporting defined in 36.133 are met.

The UE behavior is shown below in more detail as captured in TS 36.331:

---

5.6.20 Idle Mode Measurements
5.6.20.1  General
This procedure specifies the measurements done by a UE in RRC_IDLE when it has an
IDLE mode measurement configuration and the storage of the available measurements
by a UE in both RRC_IDLE and RRC_CONNECTED.
5.6.20.2  Initiation
While T331 is running, the UE shall:
　1> perform the measurements in accordance with the following:
　　2>　for each entry in measIdleCarrierListEUTRA within VarMeasIdleConfig:
　　　3>　if UE supports carrier aggregation between serving carrier and the carrier
　　　　　frequency and bandwidth indicated by carrierFreq and
　　　　　allowedMeasBandwidth within the corresponding entry;
　　　　　4>perform measurements in the carrier frequency and bandwidth indicated
　　　　　　by carrierFreq and allowedMeasBandweth within the corresponding entry;
　　　　　NOTE: The fields s-NonIntraSearch in SystemInformationBlockType3 do not
　　　　　affect the UE measurement procedures in IDLE mode. How the UE performs
　　　　　measurements in IDLE mode is up to UE implementation as long as the
　　　　　requirements in TS 36.133 [16] are met for measurement reporting. UE is
　　　　　not required to perform idle measurements if SIB2 idle measurement
　　　　　indication is not configured.
　　　　　4>if the measCellList is included:
　　　　　　5>　consider PCell and cells identified by each entry within the
　　　　　　　　measCellList be applicable for idle mode measurement reporting;
　　　　　4>else:
　　　　　　5>　consider PCell and up to maxCellMeasIdle strongest identified cells
　　　　　　　　whose RSRP/RSRQ measurement results are above the value(s)
　　　　　　　　provided in qualityThreshold (if any) to be applicable for idle mode
　　　　　　　　measurement reporting;
　　　　　4>store measurement results for cells applicable for idle mode measurement
　　　　　　reporting within the VarMeasIdleReport;
　　　3>　else:
　　　　　4>do not consider the carrier frequency to be applicable for idle mode
　　　　　　measurement reporting;
　1> if validityArea is configured in VarMeasIdleConfig and UE reselects to a serving
　　cell whose physical cell identity does not match any entry in validityArea for the
　　corresponding carrier frequency:
　　2>　stop T331;
5.6.20.3  T331 expiry or stop
The UE shall:
　1> if T331 expires or is stopped:
　　2>　release the VarMeasIdleConfig;
NOTE: It is up to UE implementation whether to continue IDLE mode measurements
according to SIB5 configuration after T331 has expired or stopped.

B. Indication of Available Early Measurements Upon Resume/Setup in LTE

Another aspect of the existing solution occurs when the UE tries to resume or setup a call from RRC_IDLE without context. If the previous step is performed, i.e. if the UE is configured to store idle measurements, the network may request the UE after resume/setup (after security is activated) whether the UE has idle measurements available.

In the case this UE is setting up a connection coming from RRC_IDLE without the AS Context, the network is not aware that the UE has available measurements stored. Then, to allow the network to know that, and possibly request the UE to report early measurements, the UE may indicate the availability of stored idle measurements in RRCConnectionSetupComplete. As not all cells would support the feature anyway, the UE only includes that availability information if the cell broadcasts the idleModeMeasurements indication in SIB2. The flag in RRCReconnectionSetupComplete and procedure text are shown below:

```
RRCConnectionSetupComplete-v1530-IEs ::= SEQUENCE {
    logMeasAvailableBT-r15        ENUMERATED {true}
    OPTIONAL,
    logMeasAvailableWLAN-r15      ENUMERATED {true}
    OPTIONAL,
    idleMeasAvailable-r15         ENUMERATED {true}
    OPTIONAL,
    flightPathInfoAvailable-r15   ENUMERATED {true}
    OPTIONAL,
    connectTo5GC-r15              ENUMERATED {true}
    OPTIONAL,
    registeredAMF-r15             RegisteredAMF-r15
    OPTIONAL,
    s-NSSAI-list-r15              SEQUENCE(SIZE (1..maxNrofS-NSSAI-r15)) OF S-
NSSAI-r15 OPTIONAL,
    ng-5G-S-TMSI-Bits-r15             CHOICE{
        ng-5G-S-TMSI-r15              NG-5G-S-TMSI-r15,
        ng-5G-S-TMSI-Part2-r15        BIT STRING (SIZE (8))
    }                                 OPTIONAL,
    nonCritical Extension         RRCConnectionSetupComplete-v1540-IEs
    OPTIONAL
}
```

5.3.3.4 Reception of the RRCConnectionSetup by the UE
    NOTE 1: Prior to this, lower layer signalling is used to allocate a C-RNTI. For
    further details see TS 36.321 [6];
The UE shall:
1> if the RRCConnectionSetup is received in response to an
    RRCConnectionResumeRequest from a suspended RRC connection:
    ...
1> set the content of RRCConnectionSetupComplete message as follows:
    2> if the RRCConnectionSetup is received in response to an
        RRCConnectionResumeRequest:
    ...
    2> if the UE is connected to EPC:
        3> except for NB-IoT:
            ...
            4> if the SIB2 contains idleModeMeasurements, and the UE
                has IDLE mode measurement information available in
                VarMeasIdleReport:
                5> include the idleMeasAvailable;
            4>stop T331 (if running);
            ...
        3> for NB-IoT:
            4> if the UE supports serving cell idle mode measurements
                reporting and servingCellMeasInfo is present in
                SystemInformationBlockType2-NB:
                5> set the measResultServCell to include the measurements of
                      the serving cell;
            NOTE 2: The UE includes the latest results of the serving cell measurements
            as used for cell selection/ reselection evaluation, which are performed in
            accordance with the performance requirements as specified in TS 36.133
            [16].
        3> include dcn-ID if a DCN-ID value (see TS 23.401 [41]) is received from
            upper layers;

In the case this UE is setting up a connection coming from RRC_IDLE but with a stored AS Context (i.e., resume from suspended), the network may be aware that the UE may have available idle measurements stored after checking the fetched context from the source node where the UE got suspended. However, it is still not certain that the UE has measurements available since the UE is only required to perform the measurements if the cells are above the configured RSRP/RSRQ thresholds and while it performs cell selection/cell reselection within the configured validity area.

Then, to allow the network to know that, and possibly request the UE to report early measurements, the UE may also indicate the availability of stored idle measurements in RRCConnectionResumeComplete. As not all cells would support the feature anyway, the UE only includes that availability information if the cell broadcasts the idleMode-Measurements indication in SIB2. The flag in RRCReconnectionResumeComplete and procedure text are shown below:

```
RRCConnectionResumeComplete-v1530-IEs ::= SEQUENCE {
    logMeasAvailableBT-r15        ENUMERATED {true}    OPTIONAL,
    logMeasAvailableWLAN-r15      ENUMERATED {true}    OPTIONAL,
    idleMeasAvailable-r15         ENUMERATED {true}    OPTIONAL,
    flightPathInfoAvailable-r15   ENUMERATED {true}    OPTIONAL,
    nonCriticalExtension          SEQUENCE {}          OPTIONAL
}
5.3.3.4a Reception of the RRCConnectionResume by the UE
The UE shall:
...
1> set the content of RRCConnectonResumeComplete message as follows:
    2>    except for NB-IoT:
        ...
        3>  if the SIB2 contains idleModeMeasurements, and the UE has IDLE
            mode measurement information available in VarMeasIdleReport:
            4>    include the idleMeasAvailable;
        3>  stop T331 (if running);
    2>    for NB-IoT:
        3>  if the UE supports serving cell idle mode measurements reporting
            and servingCellMeasInfo is present in
            SystemInformationBlockType2-NB:
            4>    set the measResultServCell to include the measurements of
                  the serving cell;
            NOTE: The UE includes the latest results of the serving cell measurements
            as used for cell selection/ reselection evaluation, which are performed in
            accordance with the performance requirements as specified in TS 36.133
            [16].
1>  submit the RRCConnectionResumeComplete message to lower layers for transmission;
1>  the procedure ends.
```

C. Reporting of Available Early Measurements Upon Resume/Setup in LTE

Once the UE indicates to the target cell upon resume or setup that idle measurements are available, the network may finally request the UE to report these available measurements by including the field idleModeMeasurementReq in the UEInformationRequest message transmitted to the UE. Then, the UE responds with a UEInformationResponse containing these measurements. This is illustrated in FIG. 6.

```
5.6.5.3 Reception of the UEInformationRequest message
Upon receiving the UEInformationRequest message, the UE shall, only after successful
security activation:
...
1> if the idleModeMeasurementReq is included in the UEInformationRequestand UE
has stored VarMeasIdleReport:
    2>    set the measResultListIdle in the UEInformationResponse message to the
          value of idleMeasReport in the VarMeasIdleReport;
    2>    discard the VarMeasIdleReport upon successful delivery of the
          UEInformationResponse message confirmed by lower layers;
...
```

UEInformationResponse message

```
-- ASN1START
UEInformationResponse-r9 ::=        SEQUENCE {
    rrc-TransactionIdentifier       RRC-TransactionIdentifier,
    criticalExtensions              CHOICE {
        c1                          CHOICE {
            ueInformationResponse-r9    UEInformationResponse-r9-IEs,
            spare3 NULL, spare2 NULL, spare1 NULL
        },
```

```
        criticalExtensionsFuture       SEQUENCE {}
    }
}
UEInformationResponse-v1530-IEs ::= SEQUENCE {
    measResultListIdle-r15          MeasResultListIdle-r15
    OPTIONAL,
    flightPathInfoReport-r15        FlightPathInfoReport-r15    OPTIONAL,
    nonCriticalExtension            SEQUENCE{}                  OPTIONAL
}
```

SUMMARY

Systems and methods are disclosed herein that provide reporting of early measurements in a cellular communications system. Embodiments of a method performed by a wireless device are disclosed. Early measurements are also referred to herein as dormant mode measurements. In some embodiments, a method performed by a wireless device comprises performing one or more dormant mode measurements, where the one or more dormant mode measurements are one or more measurements performed by the wireless device while the wireless device is in a dormant mode. The method further comprises storing the one or more dormant mode measurements, identifying a reporting scheme to be used by the wireless device to report dormant mode measurements, and reporting at least one of the stored dormant mode measurements in accordance with the identified reporting scheme.

In one embodiment, reporting the at least one of the stored dormant mode measurements comprises reporting the at least one of the stored dormant mode measurements in accordance with the identified reporting scheme in association with a connection resume procedure.

In one embodiment, identifying the reporting scheme comprises identifying the reporting scheme from among a defined set of two or more reporting schemes for dormant mode measurements.

In one embodiment, identifying the reporting scheme comprises identifying the reporting scheme from among a defined set of two or more reporting schemes for dormant mode measurements based on an explicit indication received from a network node. In one embodiment, the explicit indication is: an explicit indication broadcasted in system information; an explicit indication at msg2 during a Radio Resource Control (RRC) connection resume procedure; an explicit indication in a message; an explicit indication comprised in a measurement configuration(s) for the dormant mode measurements; or an explicit indication included or excluded during a transition of the wireless device from the dormant mode to a connected mode. In another embodiment, the explicit indication is comprised in a Radio Resource Control, RRC, release like message. In another embodiment, the explicit indication is included or included in a message received by the wireless device during a transition from the wireless device from the dormant mode to a connected mode, the message being a RRC resume message, an RRC setup message, or a paging like message.

In one embodiment, identifying the reporting scheme comprises identifying the reporting scheme from among a defined set of two or more reporting schemes for dormant mode measurements based on an implicit indication received from a network node. In one embodiment, the implicit indication is: information that indicates whether short Inactive Radio Network Temporary Identifier (I-RNTI) or full I-RNTI is to be used at connection resume, or a size of uplink grant(s) for msg3 or msg5.

In one embodiment, the defined set of two or more reporting schemes for dormant mode measurements comprise at least one reporting scheme from the following group of reporting schemes: a reporting scheme in which dormant mode measurements are reported with msg3 during a RRC resume procedure, a reporting scheme in which dormant mode measurements are reported with msg5 during a RRC resume procedure, and a reporting scheme in which dormant mode measurements are reported using UEInformationRequest/Response.

Corresponding embodiments of a wireless device are also disclosed. In some embodiments, a wireless device is adapted to perform one or more dormant mode measurements, where the one or more dormant mode measurements are one or more measurements performed by the wireless device while the wireless device is in a dormant mode. The wireless device is further adapted to store the one or more dormant mode measurements, identify a reporting scheme to be used by the wireless device to report dormant mode measurements, and report at least one of the stored dormant mode measurements in accordance with the identified reporting scheme.

In one embodiment, the wireless device comprises one or more transmitters, one or more receivers, and processing circuitry associated with the one or more transmitters and the one or more receivers. The processing circuitry is configured to cause the wireless device to perform the one or more dormant mode measurements, store the one or more dormant mode measurements, identify the reporting scheme to be used by the wireless device to report dormant mode measurements, and report the at least one of the stored dormant mode measurements in accordance with the identified reporting scheme.

Embodiments of a method performed by a base station are also disclosed. In some embodiments, a method performed by a base station comprises providing, to a wireless device, information that indicates a reporting scheme to be used by the wireless device to report dormant mode measurements, where the dormant mode measurements are one or more measurements performed by the wireless device while the wireless device is in a dormant mode.

In one embodiment, the method further comprises providing, to the wireless device, one or more configurations for dormant mode measurements.

In one embodiment, the method further comprises receiving one or more dormant mode measurements in accordance with the indicated reporting scheme.

In one embodiment, the indicated reporting scheme is a reporting scheme in which the wireless device is to report dormant mode measurements in association with a connection resume procedure.

In one embodiment, the information that indicates the reporting scheme is an explicit indication of the reporting scheme to be used by the wireless device to report dormant mode measurements. In one embodiment, the explicit indication is: an explicit indication broadcasted in system information, an explicit indication at msg2 during a RRC connection resume procedure, an explicit indication in a message, an explicit indication comprised in a measurement configuration(s) for the dormant mode measurements, or an explicit indication included or excluded during a transition of the wireless device from the dormant mode to a connected mode.

In one embodiment, the information that indicates the reporting scheme is an implicit indication of the reporting scheme to be used by the wireless device to report dormant mode measurements. In one embodiment, the implicit indication is information that indicates whether short I-RNTI or full I-RNTI is to be used at connection resume or a size of uplink grant(s) for msg3 or msg5.

In one embodiment, the indicated reporting scheme is one of a defined set of two or more reporting schemes for dormant mode measurements. In one embodiment, the defined set of two or more reporting schemes for dormant mode measurements comprises at least one reporting scheme from the following group of reporting schemes: a reporting scheme in which dormant mode measurements are reported with msg3 during a RRC resume procedure, a reporting scheme in which dormant mode measurements are reported with msg5 during a RRC resume procedure, and a reporting scheme in which dormant mode measurements are reported using UEInformationRequest/Response.

Corresponding embodiments of a base station are also disclosed. In some embodiments, a base station is adapted to provide, to a wireless device, information that indicates a reporting scheme to be used by the wireless device to report dormant mode measurements, where the dormant mode measurements are one or more measurements performed by the wireless device while the wireless device is in a dormant mode.

In one embodiment, the base station comprises processing circuitry configured to cause the base station to provide, to the wireless device, the information that indicates the reporting scheme to be used by the wireless device to report dormant mode measurements.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
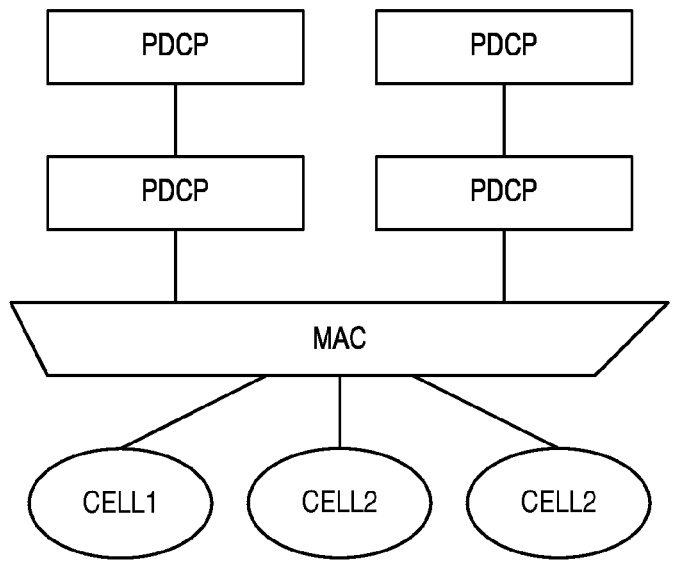
FIG. 1 illustrates Carrier Aggregation (CA) on the Medium Access Control (MAC) level.
Figure 2:
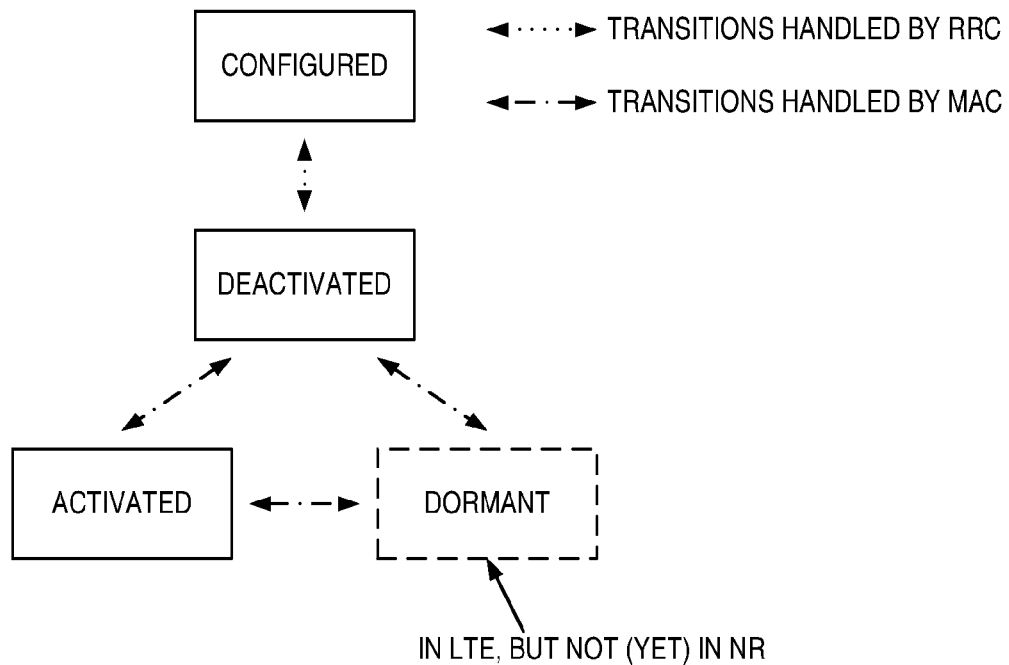
FIG. 2 illustrates the three Secondary Cell (SCell) states and transitions between those states.
Figure 3:
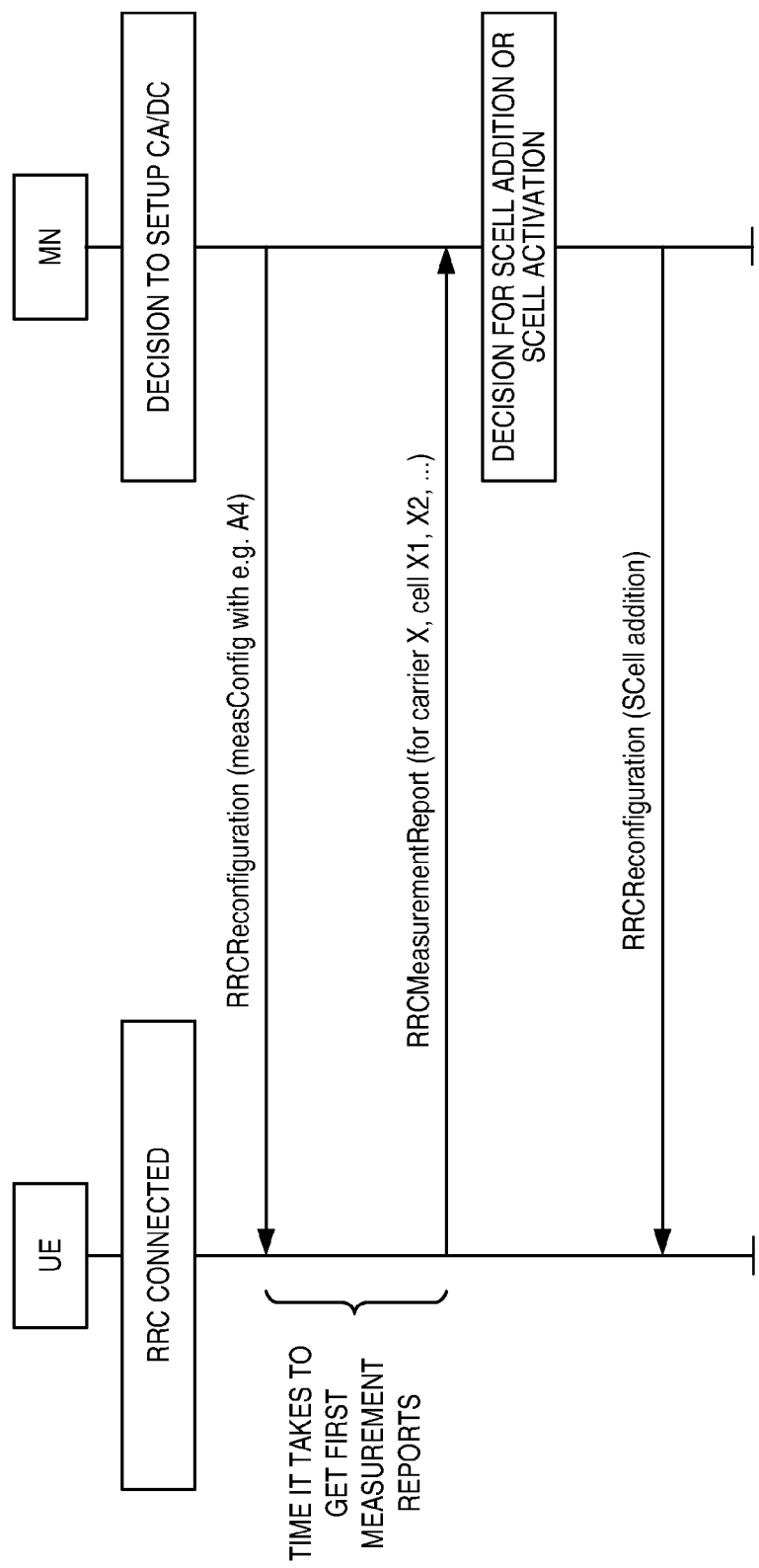
FIG. 3 illustrates a process in which the network decides to setup CA or Dual Connectivity (DC) for a User Equipment (UE)
Figure 4:
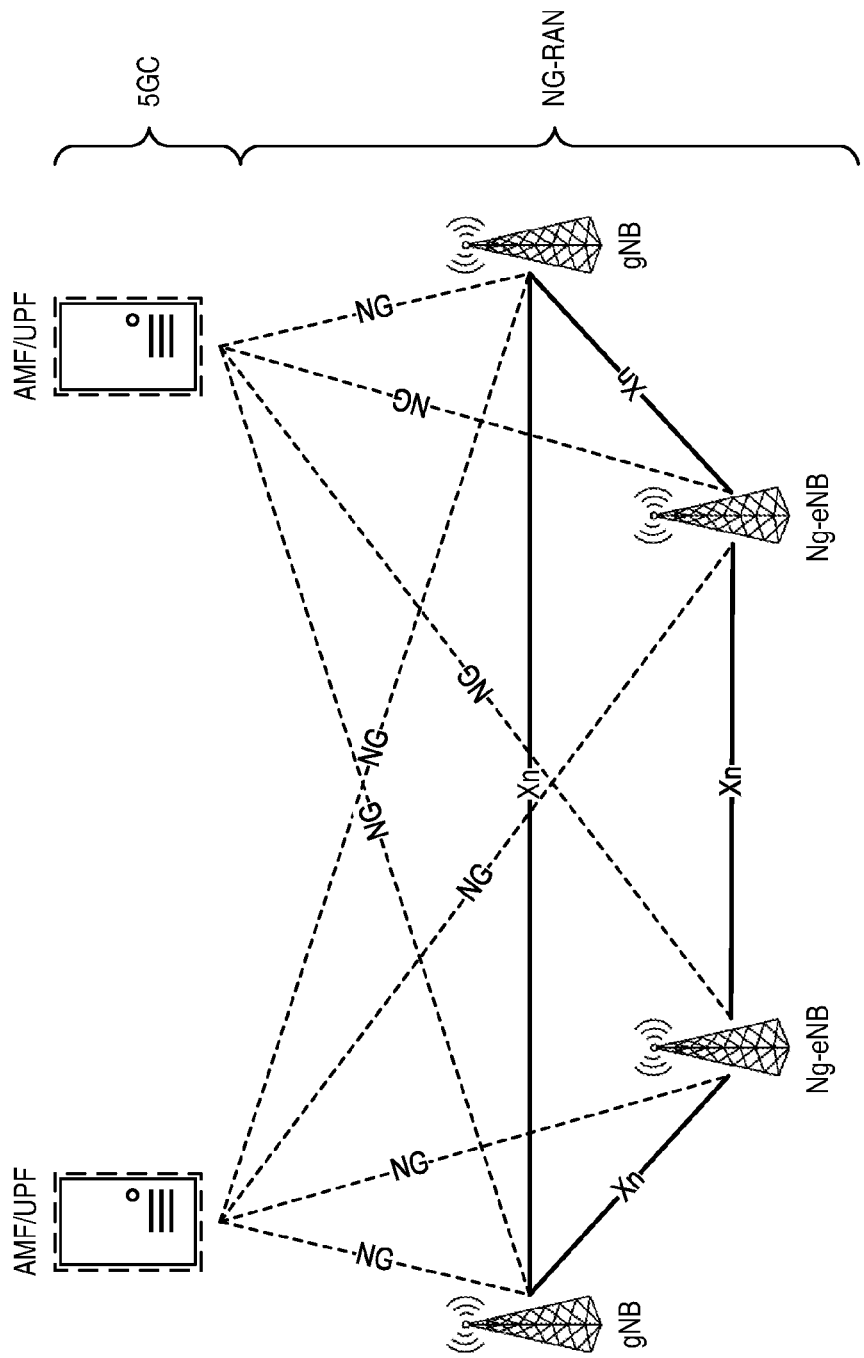
FIG. 4 illustrates how base stations are connected to each other and the node of the Fifth Generation (5G) Core (5GC) in a 5G System (5GS)
Figure 5:
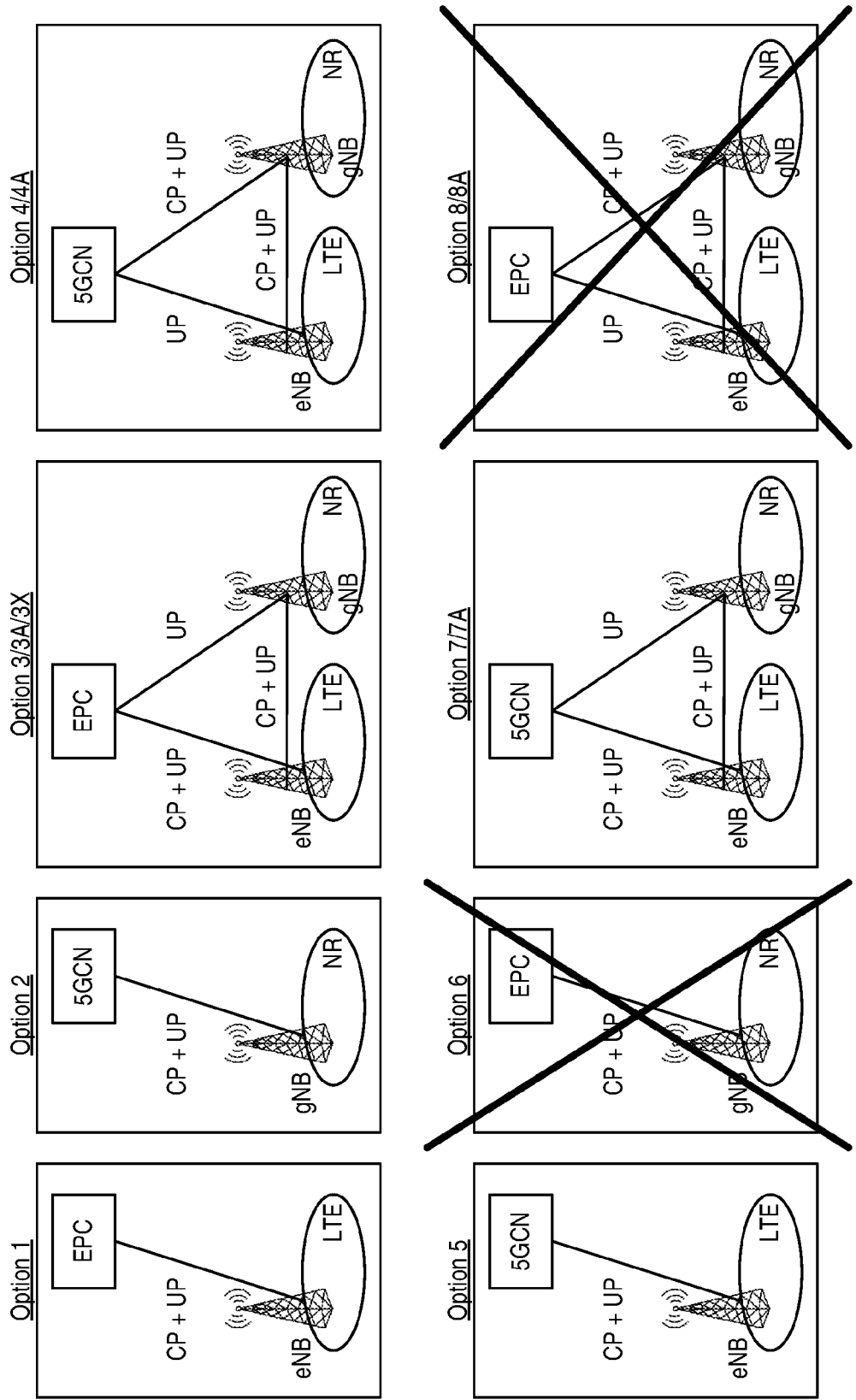
FIG. 5 illustrates different interworking options between Long Term Evolution (LTE) and New Radio (NR)
Figure 6:
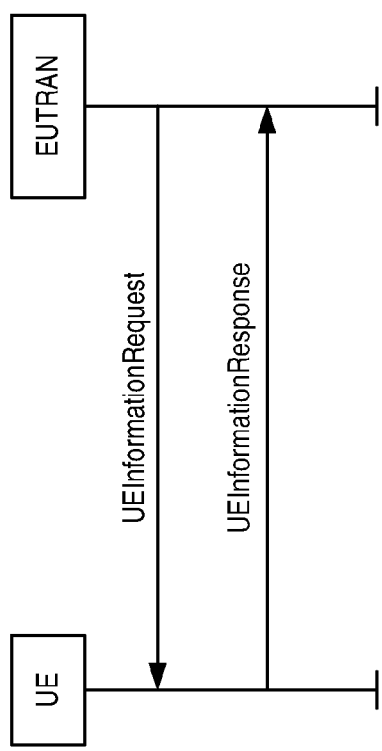
FIG. 6 illustrates the UEInformationRequest/UEInformationResponse procedure that can be used for reporting idle measurements.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) in relation to early measurement reporting. The problem addressed herein is how early idle/inactive measurements in the Release 15 baseline solution are configured and provided to the network such that the network may quickly setup Carrier Aggregation CA) and/or Dual Connectivity (DC) (which may include Evolved Universal Terrestrial Radio Access Network (E-UTRA) NR DC (EN-DC)).

Figure 7:
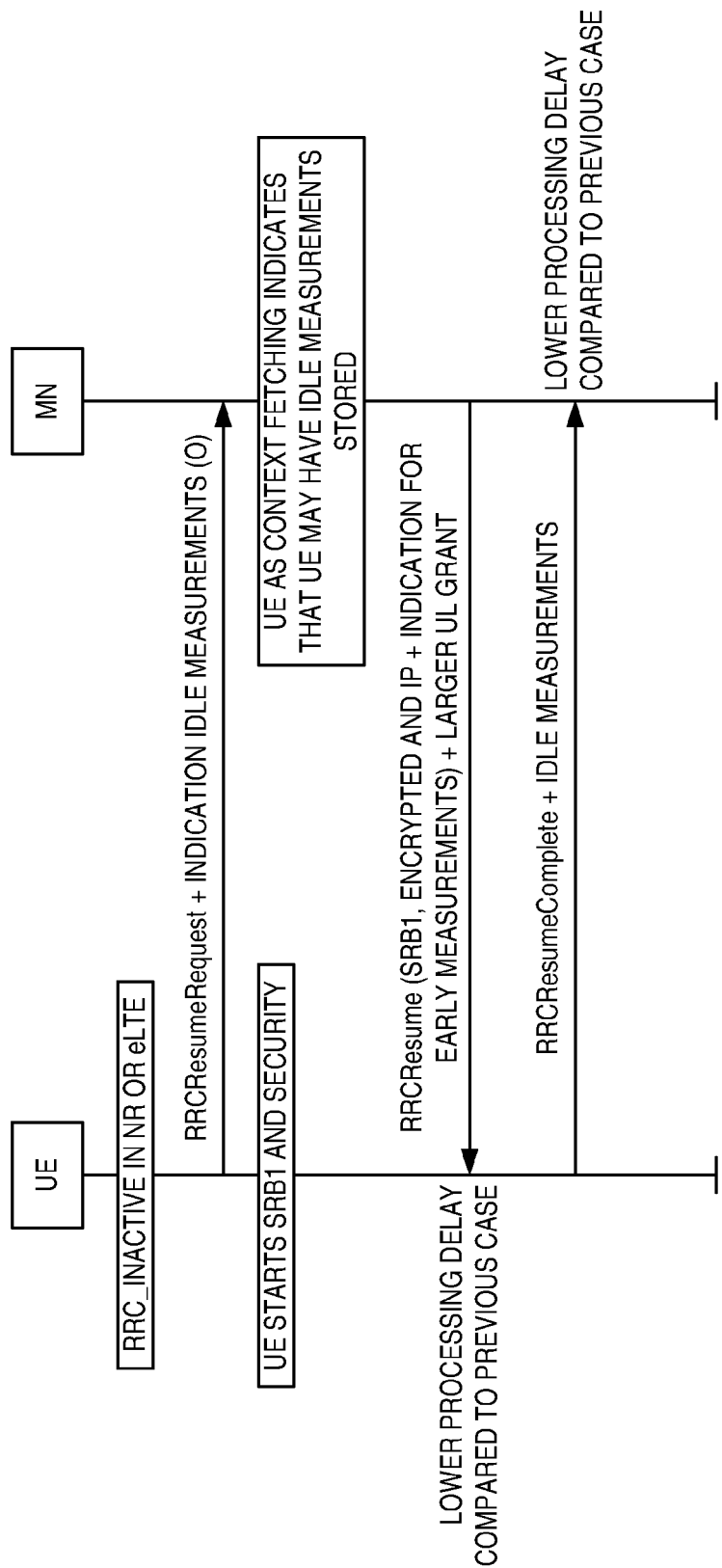
FIG. 7 illustrates early measurement reporting in msg5 during transition from suspended mode to connected mode.

In U.S. Provisional Patent Application Ser. No. 62/804, 603, entitled EARLY MEASUREMENT REPORTING WITH RRC COMPLETE MESSAGE, which was filed Feb. 12, 2019, systems and methods were disclosed for sending early measurements either inside msg5 or multiplexed together with msg5 (e.g., RRCResumeComplete) in the case of resuming a suspended connection, an example realization of which is illustrated in FIG. 7. Particularly, FIG. 7 illustrates early measurement reporting in msg5 during transition from suspended mode to connected mode according to some of the embodiments in U.S. Provisional Patent Application Ser. No. 62/804,603.

Figure 8:
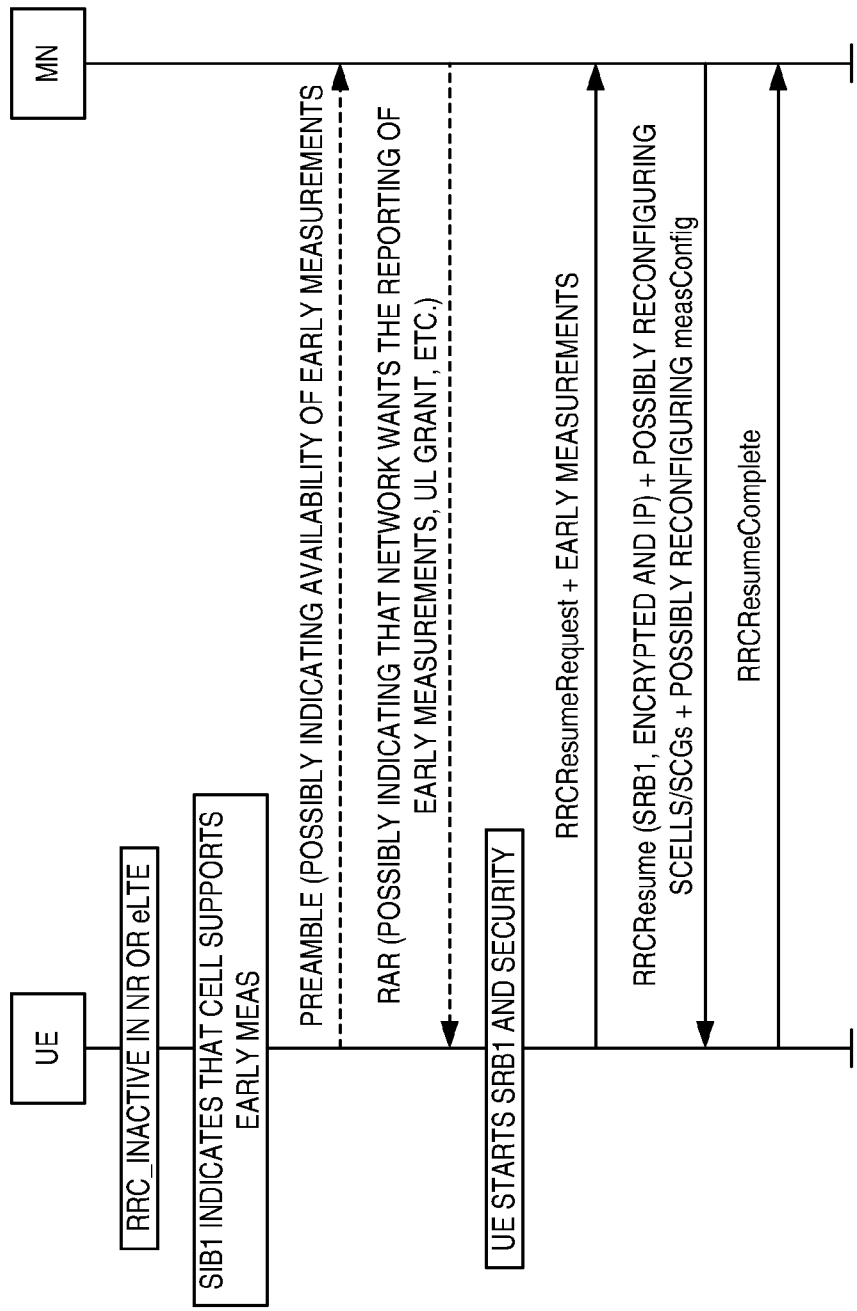
FIG. 8 illustrates early measurement reporting in msg3 during transition from suspended mode to connected mode.

In U.S. Provisional Patent Application Ser. No. 62/804, 612, entitled EARLY MEASUREMENT REPORTING WITH RRC RESUME REQUEST MESSAGE, which was filed Feb. 12, 2019, systems and methods were disclosed for sending early measurements either inside msg3 or multiplexed with msg3 (e.g., RRCResumeRequest) in the case of resuming a suspended connection, an example realization of which is illustrated in FIG. 8. Particularly, FIG. 8 illustrates early measurement reporting in msg3 during transition from suspended mode to connected mode according to some of the embodiments in U.S. Provisional Patent Application Ser. No. 62/804,612.

Sending the early measurements with msg5 (e.g., RRCResumeComplete) as compared to the LTE enhancing CA utilization (euCA) solution of sending it afterwards (as a response a UEInformationRequest from the network) will save at least one Round Trip Time (RTT) in the setting up of CA/DC based on early measurement. Sending it with msg3 (e.g., RRCResumeRequest will enable an even faster CA/DC setup based on early measurements because the measurements can be used to configure CA/DC already in the RRCResume command (i.e., no further RRC Reconfiguration is required).

Thus, from performance point of view, the msg3 solution (e.g., measurements multiplexed with RRCResumeRequest) enables the network to obtain measurements earlier than in the msg5 case (e.g., measurements with RRCResumeComplete). However, msg3 is the first scheduled message on Physical Uplink Shared Channel (PUSCH), and with channel conditions largely unknown, it requires as robust transfer as possible. That is, the size of the transport block is limited by the number of bits that can be reliably delivered to a UE at the cell edge. One possible option could have been to segment the msg3 into several transport blocks and reassemble them at the network. However, Radio Link Control (RLC) Transmission Mode (TM), which is used for sending msg3, does not support segmentation and as such msg3 has to be sent in one transport block. Sending the early measurements in a separate message but multiplexed within the same Transmit Time Interval (TTI) will not help, as compared to including the measurement results in the msg3 itself because the limitation on msg3 is due to the maximum transport block size to be safely transferred without knowing the channel conditions, rather than the number of actual bits that are used by msg3.

The present disclosure provides embodiments that address this problem of the network not being able to realize the msg3 solution in all possible scenarios and deployments, e.g., due to the inability to grant a big enough grant to send msg3 and the early measurements (either inside the msg3 or multiplexed in a separate message within the same TTI), which may be caused by coverage and/or congestion limitations.

Certain aspects of the present disclosure and their embodiments may provide solutions to the aforementioned or other challenges. Systems and methods are disclosed herein in which a network indicates to a UE what method the UE is to use for reporting of early measurements (e.g., measurements performed while in a dormant state such as, e.g., RRC_IDLE or RRC_INACTIVE) when the UE enters a connected state (e.g., RRC_CONNECTED). For example, several options for reporting of early measurements are being discussed in 3GPP, at least for the case where a UE resumes a connection and goes from RRC_INACTIVE state to RRC_CONNECTED state. This includes, e.g., transmission of reports of early measurement (performed, e.g., while in RRC_INACTIVE state) together with the msg3 signaling or together with the msg5 signaling or using the LTE Release 15 euCA solution (i.e., after connection resumption or establishment is completed via UEInformationResponse).

The indication from the network to the UE may be an explicit indication or an implicit indication. Some examples are as follows:

Explicit indication, e.g.
  Broadcasting of an explicit indication (concerning method to use for the early measurement reporting) in system information;
  Including an explicit indication at transmission of msg2, e.g. explicitly in Random Access Response (RAR) or in a Medium Access Control (MAC) Control Element (CE);
  Including an explicit indication in, e.g., RRC Release like message, telling the UE which method to use to report early measurements. This indication could, e.g., be part of the early measurement configurations; or
  Including/Excluding an explicit indication during the UE's transition to CONNECTED state (e.g., in RRCResume, RRCSetup, or Paging like message); or
Implicit indication, e.g.
  Having the selection of the method be based on the broadcasted indication whether short Inactive Radio Network Temporary Identifier (I-RNTI) or full I-RNTI is to be used at connection resume (based on the inclusion or not of the useFullResumeID in SIB1); or
  Depending on the size of the uplink grants for msg3/5.

In some embodiments, transmission of early measurements performed during dormant state, during the UE's transition to CONNECTED state, is enabled in a different way (e.g., either based on msg3 or msg5 or UEInformationRequest/Response) depending on, e.g., network conditions such as coverage and/or load limitations.

Certain embodiments may provide one or more of the following technical advantage(s). In some embodiments, the advantage is that the network can decide the best option for the UE to report early measurements during transition from dormant state to CONNECTED state (i.e., msg3 based or msg5 based) depending on the target cell's conditions such as coverage and/or load limitations.

Figure 9:
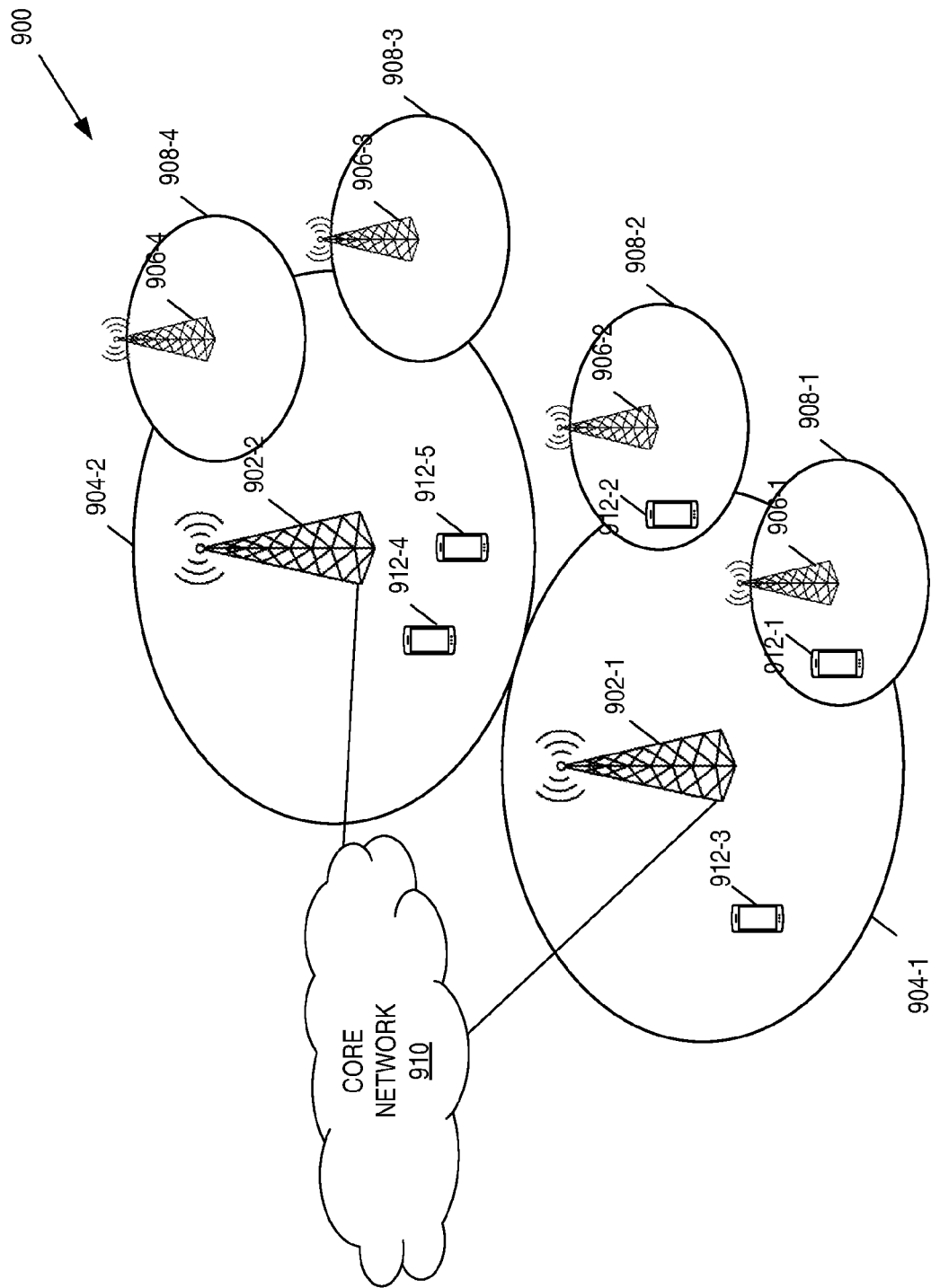
FIG. 9 illustrates one example of a cellular communications network in which embodiments of the present disclosure may be implemented.

FIG. 9 illustrates one example of a cellular communications network 900 according to some embodiments of the present disclosure. In the embodiments described herein, the cellular communications network 900 is a LTE or 5G NR network. In this example, the cellular communications network 900 includes base stations 902-1 and 902-2, which in LTE are referred to as eNBs and in 5G NR are referred to as gNBs, controlling corresponding macro cells 904-1 and 904-2. The base stations 902-1 and 902-2 are generally referred to herein collectively as base stations 902 and individually as base station 902. Likewise, the macro cells 904-1 and 904-2 are generally referred to herein collectively as macro cells 904 and individually as macro cell 904. The cellular communications network 900 may also include a number of low power nodes 906-1 through 906-4 controlling corresponding small cells 908-1 through 908-4. The low power nodes 906-1 through 906-4 can be small base stations (such as pico or femto base stations) or Remote Radio Heads (RRHs), or the like. Notably, while not illustrated, one or more of the small cells 908-1 through 908-4 may alternatively be provided by the base stations 902. The low power nodes 906-1 through 906-4 are generally referred to herein collectively as low power nodes 906 and individually as low power node 906. Likewise, the small cells 908-1 through 908-4 are generally referred to herein collectively as small cells 908 and individually as small cell 908. The base stations 902 (and optionally the low power nodes 906) are connected to a core network 910.

The base stations 902 and the low power nodes 906 provide service to wireless devices 912-1 through 912-5 in the corresponding cells 904 and 908. The wireless devices 912-1 through 912-5 are generally referred to herein collectively as wireless devices 912 and individually as wireless device 912. The wireless devices 912 are also sometimes referred to herein as UEs.

I. UE Embodiments

Figure 10:
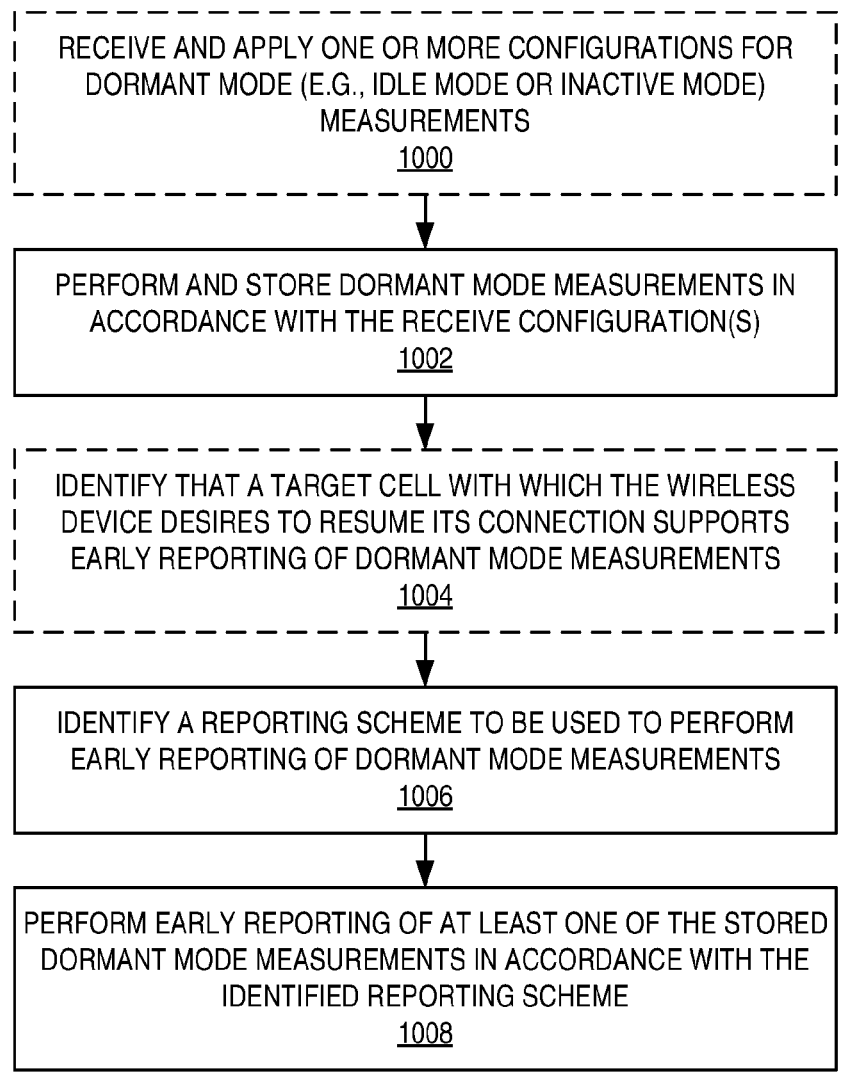
FIG. 10 illustrates the operation of a wireless device (e.g., UE) in accordance with some embodiments of the present disclosure.

Embodiments of a method performed by (i.e., executed by) a wireless device (e.g., a UE) for measurement reporting during a transition from a dormant state (e.g., RRC_INACTIVE or RRC_IDLE with or without context information) to a connected state (e.g., RRC_CONNECTED) (e.g., to assist the network to perform a UE reconfiguration, e.g. handovers, reconfiguration with sync, Secondary Cell Group (SCG) addition/removal/modification, Secondary Cell (SCell) addition/removal/modification, etc.)) are disclosed herein. In some embodiments, as illustrated in FIG. 10, the method performed by a wireless device (e.g., a wireless device 912) comprises:

Step 1000 (optional): Receiving and applying configurations for idle/inactive mode measurements from at least one of:
  a first cell (source cell) upon entering dormant state in a Radio Resource Control (RRC) message (e.g., RRCRelease or RRCConnectionRelease), and
  a second cell through broadcasted signaling (e.g., System Information Block 5 (SIB5) in LTE or SIB4 in NR).
Step 1002: Performing and storing idle/inactive mode measurements according to the received idle/inactive mode measurement configurations.
Step 1004 (optional): Identifying that a third cell (the target cell) in which the UE is camping and where the UE is trying to resume a connection supports early measurements performed in idle and/or inactive state to be reported as described in the method.
  Note: The first, second, and third cells may be the same cell, two different cells (in any combination), or three different cells.
Step 1006: Identifying the method to be used to perform early measurement reporting according to at least one criterion, e.g.:
  Receiving an indication broadcasted by the network in system information or paging; or
  Receiving a specific RACH configuration (e.g., a specific RACH configuration that indicates that the network supports early measurement reporting via msg3; or
  Receiving an indication in RRC_CONNECTED, e.g. in the RRCRelease message or included in the idle/inactive mode measurement configurations; or
  Receiving an indication during the transition to connected state (e.g., in RAR, RRCResume, RRCSetup etc.).
Step 1008: On starting the connection resume procedure (e.g., paging received indicating downlink data, arrival of uplink data, RAN area update, etc.), applying the identified measurement reporting method (e.g., reporting via msg3, msg5, or in CONNECTED mode with ULInformationRequest/Response).

A. Identifying to Use Msg3 to Report Early Measurements

In one embodiment, the UE is configured to perform idle/inactive measurements, and will report these early measurements in msg3 if:
  The UE has received an explicit indication such as one of the following.
    The target cell has indicated via a new field included in SIB (e.g., in SIB1, 2, 4, 5, etc.) that the msg3 is to be used for reporting early measurements; or
    The UE receives an explicit indication in, e.g., RRC Release like message, telling the UE to report early measurements in msg3. This indication could, e.g., be part of the early measurement configurations; or
    The UE has received an indication in msg2, e.g. explicitly in RAR or in a MAC CE.
  The UE has received an implicit indication such as one of the following.
    The target cell has indicated the usage of the full I-RNTI (40 bit UE identifier for resumption) by including the useFullResumeID in the SIB1 (or equivalent flag), which can be interpreted as a sign that the target is able to provide large grants (i.e., if userFullResumeID was not included, UEs have to use the short I-RNTI in the RRCResumeRequest, which is 2 bytes shorter than the full I-RNTI); or
    The target cell has indicated via a specific Random Access Channel (RACH) configuration that it supports early measurement reporting via msg3, e.g. the RACH configuration comprises a specific RACH partitioning configuration where a subset of resources is selected and used by the UE to indicate to the network that early idle/inactive measurements are available. Hence, the broadcasting of that RACH configuration is used as an implicit indication to the UE that the target cell supports early measurements on msg3.
The UE would then initiate the reporting of the early measurements by performing the following actions.

The UE selects random access parameters of a target cell, such as a random access resource (e.g., a specific preamble from a specific preamble group), where the selection indicates that the UE has available measurements performed in dormant state (e.g., RRC_IDLE or RRC_INACTIVE). After this selecting, the UE transmits a selected random access preamble in the selected random access resource.

The UE receives an indication from the network, for example with the RAR message, that the UE is to transmit early measurements performed in idle/inactive if these are available.

This indication may be implicit (e.g., a large grant) or explicit (some payload information in the RAR or a MAC CE).

The UE transmits measurements performed in dormant state (e.g., RRC_IDLE with Access Stratum (AS) Context, RRC_IDLE or RRC_INACTIVE), if available, with an RRC Resume Request like message (e.g., RRCResumeRequest or RRCConnectionResumeRequest) or in a separate message multiplexed in the same radio frame with the RRC Resume Request like message.

The UE receives a reconfiguration from the network in an RRC Resume like message (e.g., RRCResume, RRCConnectionResume, RRCReconfiguration or RRCConnectionReconfiguration) to add, modify, remove, change state of (activate/deactivate/etc.) SCGs, SCell(s), perform handovers, or any other action that may be assisted by early measurements, and applying the reconfiguration(s).

B. Identifying to Use Msg5 to Report Early Measurements

In another embodiment, the UE is configured to perform idle/inactive measurements, and will report these early measurements in msg5 if:

The UE has received an explicit indication such as:
the target cell has indicated via a new field included in SIB (e.g., in SIB1, 2, 4, 5, etc.) that the msg5 is to be used for reporting early measurements;
the UE receives an explicit indication in, e.g., RRC Release like message to use msg5 solution;
the UE has received an indication in msg2, e.g. explicitly in RAR or in a MAC CE; or
the UE has received an indication in msg4 (e.g., in RRCResume or RRCSetup) to use the msg5 solution.

The UE has received an implicit indication such as:
the target cell has indicated the usage of the short I-RNTI (24 bit UE identifier for resumption) instead of the full I-RNTI (40 bit UE identifier for resumption) by not including the useFullResumeID in the SIB1.

If the UE has decided to use the msg5 solution, it will initiate the reporting of the early measurements by performing the following actions.

Optionally, the UE includes an indication, in the RRC Resume Request or RRC Setup Request like message (e.g., RRCResumeRequest) to be transmitted to the target cell, that the UE has available measurements performed in dormant state (e.g., RRC_IDLE or RRC_INACTIVE). In the case of a Resume Request, that message also includes an I-RNTI (UE AS context identifier), a security token (e.g., resume MAC-I), and a cause value.

The UE receives an indication from the network with the RRC Resume or RRC Setup like message (e.g., RRCResume or RRCConnectionResume) that the UE is to include early measurements performed in idle/inactive in an RRC Resume Complete or RRC Setup Complete or Security Mode Complete like message (e.g., with an RRCResumeComplete or RRCConnectionResumeComplete, RRCSetupComplete, SecurityModeComplete), if these are available.

The UE transmits available measurements performed in dormant state (e.g., RRC_IDLE with AS Context, RRC_IDLE or RRC_INACTIVE) with an RRC Resume Complete or RRC Setup Complete or Security Mode Complete like message (e.g., with an RRCResumeComplete or RRCConnectionResumeComplete or RRCSetupComplete, SecurityModeComplete), or a separate message multiplexed in the same radio frame with this message.

The UE receives a reconfiguration from the network in an RRC Reconfiguration like message (e.g., RRCReconfiguration, RRCConnectionReconfiguration) to add, modify, remove, change state of (activate/deactivate/etc.) SCGs, SCell(s), perform handovers, or any other action that may be assisted by early measurements) and applying the reconfiguration.

In another embodiment, instead of receiving a configuration prior to initiating the reporting of the early measurements, the UE will initiate transmission of the early measurements based on the msg3 solution (e.g., this could have been configured via RRCRelease in source cell), and will receive an indication during the procedure whether to use the msg3 or msg5 solution, e.g.:

The UE selects random-access parameters of a target cell, such as a random access resource (e.g., a specific preamble from a specific preamble group), where the selection indicates that the UE has available measurements performed in dormant state (e.g., RRC_IDLE or RRC_INACTIVE). After this selecting, the UE transmits a selected random access preamble in the selected random access resource; and In response to that, the UE receives an indication from the network, for example with the RAR message, that the UE shall not transmit early measurements performed in idle/inactive with msg3. This indication may be implicit (e.g., a smaller grant) or explicit (some payload information in the RAR or a MAC CE).

C. Identifying to Use UEInformationRequest/Response to Report Early Measurements In another embodiment, the UE uses the UEInformationRequest/Response method to report the early measurements performed in idle/inactive (i.e., use the LTE Release 15 solution) if:

the target cell has indicated via a new field included in SIB (e.g., in SIB1, 2, 4, 5, etc.) that the ULInformationRequest/Response is to be used for reporting early measurements;
This indication in SIB could be an absence of indication for msg3 and/or msg5; or
the UE receives an explicit indication in, e.g., RRC Release like message, telling the UE to report early measurements in CONNECTED mode using ULInformationRequest/Response. This indication could, e.g., be part of the early measurement configurations or be an absence of an indication to use the msg3 and/or the msg5 solution.

If the UE has decided to use the ULInformationRequest/Response solution, it will initiate the reporting of the early measurements by (based to the LTE Release 15 solution) performing the following actions.

The UE includes an indication, in the RRC Resume Complete or RRC Setup Complete like message (e.g., RRCResumeComplete) to be transmitted to the target cell, that the UE has available measurements performed in dormant state (e.g., RRC_IDLE or RRC_INACTIVE).

The UE receives an ULInformationRequest like message from the network indicating that the UE is to report early measurements performed in idle/inactive with the ULInformationResponse message, if these are available.

The UE transmits available measurements performed in dormant state (e.g., RRC_IDLE with AS Context, RRC_IDLE, or RRC_INACTIVE) with an uplink Information Response like message.

The UE receives a reconfiguration from the network in an RRC Reconfiguration like message (e.g., RRCReconfiguration, RRCConnectionReconfiguration) to add, modify, remove, change state (activate/deactivate/etc.) SCGs, SCell(s), perform handovers, or any other action that may be assisted by early measurements) and applying the reconfiguration.

In another embodiment, instead of receiving a configuration prior to initiating the reporting of the early measurements, the UE initiates transmission of the early measurements based on the msg3 or msg5 solution, and receives an indication during the procedure that tells the UE whether to use the msg3 or msg5 or ULInformationRequest/Response solution, e.g. (where the UE tries to use msg3 at the beginning). The UE operates as follows:

The UE selects random-access parameters of a target cell, such as a random access resource (e.g., a specific preamble from a specific preamble group), where the selection indicates that the UE has available measurements performed in dormant state (e.g., RRC_IDLE or RRC_INACTIVE). After this selecting, the UE transmits a selected random access preamble in the selected random access resource; and In response to that, the UE receives an indication from the network, for example with the RAR message, that the UE shall not transmit early measurements performed in idle/inactive with msg3. This indication may be implicit (e.g., a smaller grant) or explicit (some payload information in the RAR or a MAC CE).

Upon transmitting the RRC Resume Request or RRC Setup Request like message (e.g., RRCResumeRequest, RRCSetupRequest) to the network, the UE receives an RRC Resume or RRC Setup like message (e.g., RRCResume, RRCSetup) comprising an indication whether to use the msg5 solution or the ULInformationRequest/Response solution. This indication could be a single flag, e.g. reportEarlyMeasInComplete which, if true, the UE shall include measurements in msg5 and if false, the UE shall await an ULInformationRequest message. Alternatively, the indication could be the reverse, i.e. if the indication is false the UE shall report measurements in msg5, and if true the UE shall await the request in CONNECTED mode. Alternatively, the absence of an indication in the response can be considered as an implicit indication to revert to the UEInformationRequest/Response solution.

This solution could also be applied if the UE has originally tried to use the msg5 solution.

II. Network Embodiments

Figure 11:
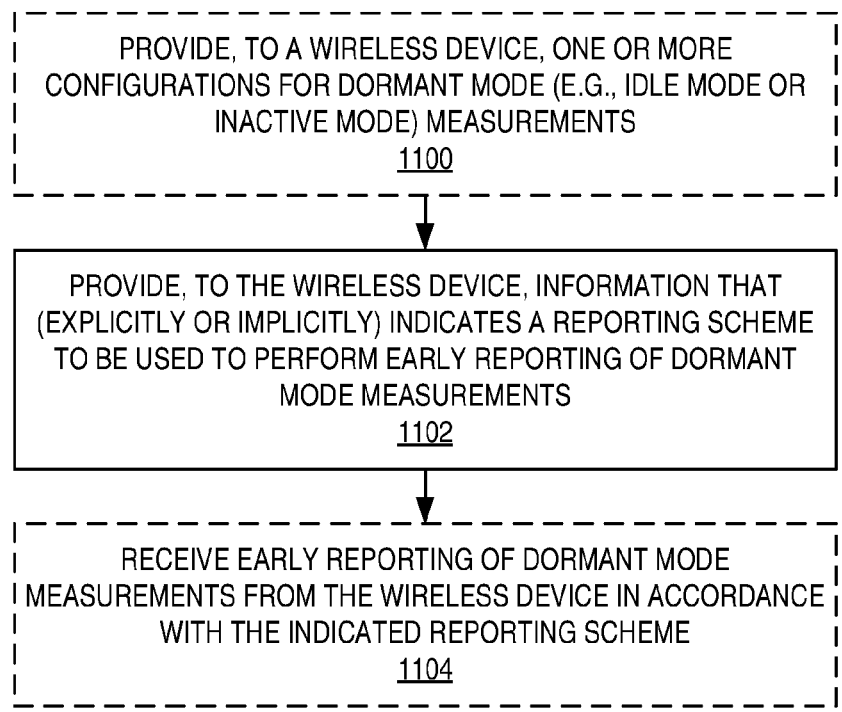
FIG. 11 illustrates the operation of a network node (e.g., a base station) in accordance with some embodiments of the present disclosure.

Embodiments of a method performed by (i.e., executed by) a network node (e.g., a base station such as, e.g., an eNB or gNB) for measurement reporting during a UE's transition from a dormant state (e.g., RRC_INACTIVE or RRC_IDLE with or without context information) to a connected state (e.g., RRC_CONNECTED) (e.g., to assist the network to perform a UE reconfiguration, e.g. handovers, reconfiguration with sync, SCG addition/removal/modification, SCell addition/removal/modification, etc.)) are disclosed herein. In some embodiments, as illustrated in FIG. 11 the method performed by a network node (e.g., a base station 922) comprises:

Step 1100 (Optional): Providing a UE with configurations for idle/inactive mode measurements from at least one of:
   a first cell (source cell) upon entering dormant state in an RRC message (e.g., RRCRelease or RRCConnectionRelease),
   a second cell through broadcasted signaling (e.g., SIB5 in LTE or SIB4 in NR)

Step 1102: Indicating to the UE the method to use to perform early measurement reporting, e.g.:
   Providing an indication (e.g., broadcasting or paging);
   Providing a predefined random access preamble;
   Providing an indication in RRC_CONNECTED, e.g. in the RRCRelease message or included in the idle/inactive mode measurement configurations; or
   Providing an indication during the UE's transition to connected state (e.g., in RAR, RRCResume, RRCSetup, etc.).

Step 1104 (Optional): Receive dormant mode measurements reported by the UE in accordance with the indicated early reporting scheme.

A. Indicating to Use Msg3 to Report Early Measurements

In one embodiment, the network configures the UE to perform idle/inactive measurements, and to report these early measurements in msg3 by:

Providing an explicit indication such as:
   The target cell indicates via a new field included in SIB (e.g., in SIB1, 2, 4, 5, etc.) that the msg3 is to be used for reporting early measurements; or
   Including an explicit indication in, e.g., RRC Release like message, telling the UE to report early measurements in msg3. This indication could, e.g., be part of the early measurement configurations; or
   Indicating to the UE in msg2, e.g. explicitly in RAR or in a MAC CE Providing an implicit indication such as:
   The target cell indicates the usage of the full I-RNTI (40 bit UE identifier for resumption) by including the useFullResumeID in the SIB1 (or equivalent flag), which can be interpreted as a sign that the target is able to provide large grants (i.e., if userFullResumeID was not included, UEs have to use the short I-RNTI in the RRCResumeRequest, which is 2 bytes shorter than the full I-RNTI); or
   The target cell indicates via a specific RACH configuration that it supports early measurement reporting via msg3, e.g. the RACH configuration comprises a specific RACH partitioning configuration where a subset of resources is selected and used by the UE to indicate to the network that early idle/inactive measurements are available. Hence, the broadcasting of that RACH configuration is used as an implicit indication to the UE that the target cell supports early measurements on msg3.

When the UE initiates the reporting of the early measurements by selecting random access parameters of a target cell, such as a random access resource (e.g., a specific preamble from a specific preamble group), where the selection indicates that the UE has available measurements performed in dormant state (e.g., RRC_IDLE or RRC_INACTIVE), the network will:
  provide an indication, for example with the RAR message that the UE shall transmit early measurements performed in idle/inactive if these are available;
    This indication may be implicit (e.g., a large grant) or explicit (some payload information in the RAR or a MAC CE).
  receive measurements performed by the UE in dormant state (e.g., RRC_IDLE with AS Context, RRC_IDLE or RRC_INACTIVE), if available, with an RRC Resume Request like message (e.g., RRCResumeRequest or RRCConnectionResumeRequest or in a separate message multiplexed in the same radio frame with the RRC Resume Request like message
  provides a reconfiguration to the UE in an RRC Resume like message (e.g., RRCResume, RRCConnectionResume, RRCReconfiguration or RRCConnectionReconfiguration) to add, modify, remove, change state (activate/deactivate/etc.) SCGs, SCell(s), perform handovers, or any other action that may be assisted by early measurements, and applying the reconfiguration(s).

B. Indicating to Use Msg5 to Report Early Measurements

In another embodiment, the network configures the UE to perform idle/inactive measurements, and to report these early measurements in msg5 by:
  Providing an explicit indication such as:
    The target cell indicates, via a new field included in SIB (e.g., in SIB1, 2, 4, 5, etc.), that the msg5 is to be used for reporting early measurements
    The network includes an explicit indication in, e.g., RRC Release like message to use msg5 solution.
    Indicating to the UE in msg2, e.g. explicitly in RAR or in a MAC CE
  Providing an implicit indication such as:
    The target cell indicates the usage of the short I-RNTI (24 bit UE identifier for resumption) instead of the full I-RNTI (40 bit UE identifier for resumption) by not including the useFullResumeID in the SIB1;
  When the UE initiates the reporting of the early measurements via msg5 solution, the network:
    Receives an indication from the UE in an RRC Resume Request or RRC Setup Request like message (e.g., RRCResumeRequest, RRCSetupRequest) that the UE has available measurements performed in dormant state (e.g., RRC_IDLE or RRC_INACTIVE).
    Includes an indication to the UE in the RRC Resume or RRC Setup like message (e.g., RRCResume or RRCConnectionResume, RRCSetup, RRCConnectionSetup) that the UE shall include early measurements performed in idle/inactive in an RRC Resume Complete or RRC Setup Complete or Security Mode Complete like message (e.g., with an RRCResumeComplete or RRCConnectionResumeComplete or RRCSetupComplete, SecurityModeComplete), if these are available;
    Receives available measurements performed by the UE in dormant state (e.g., RRC_IDLE with AS Context, RRC_IDLE or RRC_INACTIVE) with an RRC Resume Complete or RRC Setup Complete or Security Mode Complete like message (e.g., with an RRCResumeComplete or RRCConnectionResumeComplete or RRCSetupComplete, SecurityModeComplete), or a separate message multiplexed in the same radio frame with this message
    Provides a reconfiguration to the UE in an RRC Reconfiguration like message (e.g., RRCReconfiguration, RRCConnectionReconfiguration) to add, modify, remove, change state (activate/deactivate/etc.) SCGs, SCell(s), perform handovers, or any other action that may be assisted by early measurements) and applying the reconfiguration.

In another embodiment, the network receives a message from the UE initiating the reporting of the early measurements according to msg3 solution but will send an indication to the UE to resort to the msg5 solution, e.g.
  the network receives a random access message from the UE (e.g., using a specific preamble from a specific preamble group), where the indication indicates that the UE has available measurements performed in dormant state (e.g., RRC_IDLE or RRC_INACTIVE); and
  in response to that, the network sends an indication to the UE, for example with the RAR message that the UE shall not transmit early measurements performed in idle/inactive with msg3. This indication may be implicit (e.g., a smaller grant) or explicit (some payload information in the RAR or a MAC CE).

C. Indicating to Use UEInformationRequest/Response to Report Early Measurements

In another embodiment, the network indicates to the UE to use the UEInformationRequest/Response method to report the early measurements performed in idle/inactive (i.e., use the LTE Release 15 solution) by:
  Indicating, via a new field included in SIB (e.g., in SIB1, 2, 4, 5, etc.), that the ULInformationRequest/Response is to be used for reporting early measurements.
    This indication in SIB could be an absence of indication for msg3 and/or msg5.
  Indicating via an explicit indication in, e.g., RRC Release like message, telling the UE to report early measurements in CONNECTED mode using ULInformationRequest/Response. This indication could e.g. be part of the early measurement configurations or be an absence of an indication to use the msg3 and/or the msg5 solution.
  When the UE initiates the reporting of early measurements using the ULInformationRequest/Response solution, the network:
    Receives an indication from the UE in the RRC Resume Complete or RRC Setup Complete like message (e.g., RRCResumeComplete, RRCSetupComplete) that the UE has available measurements performed in dormant state (e.g., RRC_IDLE or RRC_INACTIVE).
    Sends a ULInformationRequest like message to the UE indicating that the UE shall report early measurements performed in idle/inactive with the ULInformationResponse message, if these are available;
    Receives available measurements performed in dormant state (e.g., RRC_IDLE with AS Context, RRC_IDLE or RRC_INACTIVE) from the UE in a ULInformationResponse like message
    Provides a reconfiguration to the UE in an RRC Reconfiguration like message (e.g., RRCReconfiguration, RRCConnectionReconfiguration) to add, modify, remove, change state (activate/deactivate/etc.) SCGs, SCell(s), perform handovers, or any other action that may be assisted by early measurements) and applying the reconfiguration.

In another embodiment, the network receives a message from the UE initiating the reporting of the early measurements according to msg3 or msg5 solution but sends an indication to the UE to resort to the ULInformationRequest/Response solution, e.g. where the UE tries to use msg3 at the beginning:

the network receives a random access message from the UE (e.g., using a specific preamble from a specific preamble group), where the indication indicates that the UE has available measurements performed in dormant state (e.g., RRC_IDLE or RRC_INACTIVE); and in response to that, the network sends an indication to the UE, for example with the RAR message that the UE shall not transmit early measurements performed in idle/inactive with msg3. This indication may be implicit (e.g., a smaller grant) or explicit (some payload information in the RAR or a MAC CE).

Upon receiving the RRC Resume Request or RRC Setup Request like message (e.g., RRCResumeRequest, RRCSetupRequest) from the UE, the network sends an RRC Resume or RRC Setup like message (e.g., RRCResume, RRCSetup) comprising an indication whether to use the msg5 solution or the ULInformationRequest/Response solution. This indication could be a single flag, e.g. reportEarlyMeasInComplete which if true, the UE shall include measurements in msg5 and if false, the UE shall await an ULInformationRequest message. Alternatively, the indication could be the reverse, i.e. if the indication is false the UE shall report measurements in msg5, and if true the UE shall await the request in CONNECTED mode. Alternatively, the absence of an indication in the response can be considered as an implicit indication to revert to the UEInformationRequest/Response solution.

This solution could also be applied if the UE has originally tried to use the msg5 solution.

III. Additional Aspects

Figure 12:
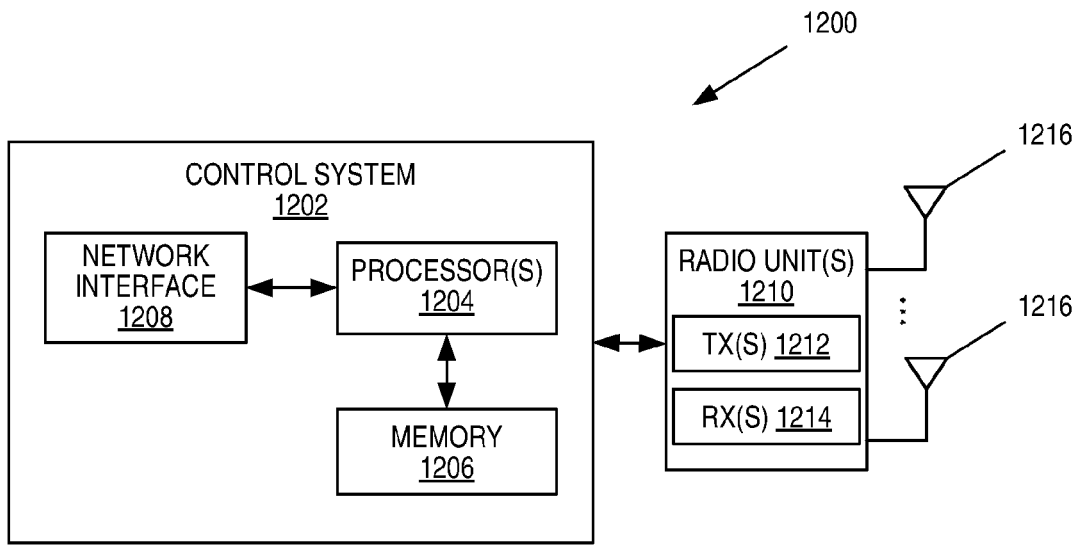
FIGS. 12 through 14 are schematic block diagrams of a network node.

FIG. 12 is a schematic block diagram of a radio access node 1200 according to some embodiments of the present disclosure. The radio access node 1200 may be, for example, a base station 902 or 906. As illustrated, the radio access node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the radio access node 1200 includes one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a radio access node 1200 (e.g., one or more functions of a network node described herein in section II of the Detailed Description above) as described herein. In some embodiments, the function(s) are implemented in software that is stored, e.g., in the memory 1206 and executed by the one or more processors 1204.

Figure 13:
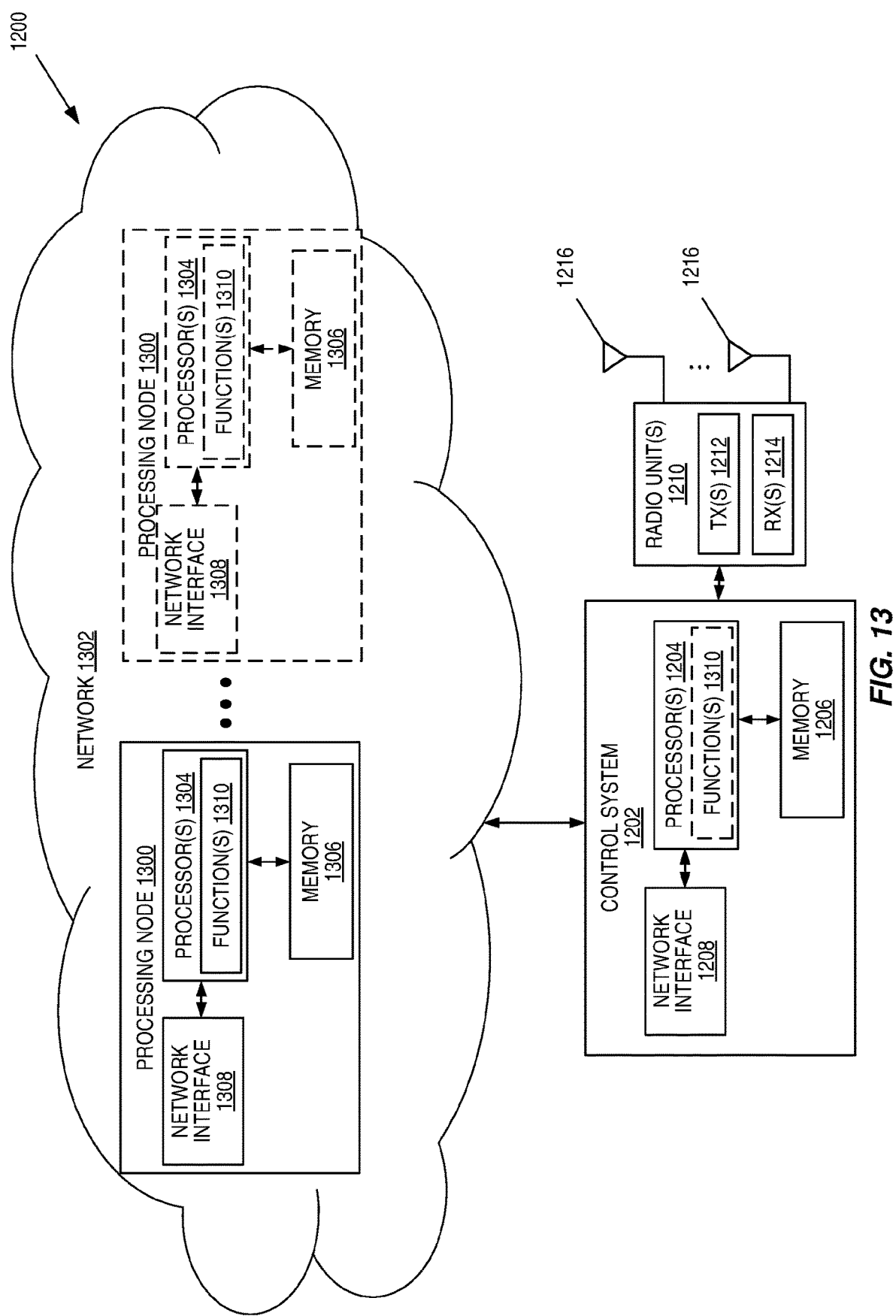

FIG. 13 is a schematic block diagram that illustrates a virtualized embodiment of the radio access node 1200 according to some embodiments of the present disclosure. This discussion is equally applicable to other types of network nodes. Further, other types of network nodes may have similar virtualized architectures.

As used herein, a "virtualized" radio access node is an implementation of the radio access node 1200 in which at least a portion of the functionality of the radio access node 1200 is implemented as a virtual component(s) (e.g., via a virtual machine(s) executing on a physical processing node(s) in a network(s)). As illustrated, in this example, the radio access node 1200 includes the control system 1202 that includes the one or more processors 1204 (e.g., CPUs, ASICs, FPGAs, and/or the like), the memory 1206, and the network interface 1208 and the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the radio access node 1200 described herein (e.g., one or more functions of a network node described herein in section II of the Detailed Description above) are implemented at the one or more processing nodes 1300 or distributed across the control system 1202 and the one or more processing nodes 1300 in any desired manner. In some particular embodiments, some or all of the functions 1310 of the radio access node 1200 described herein (e.g., one or more functions of a network node described herein in section II of the Detailed Description above) are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of radio access node 1200 (e.g., one or more functions of a network node described herein in section II of the Detailed Description above) or a node (e.g., a processing node 1300) implementing one or more of the functions 1310 of the radio access node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
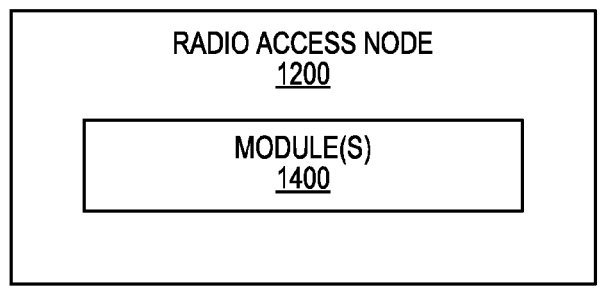

FIG. 14 is a schematic block diagram of the radio access node 1200 according to some other embodiments of the present disclosure. The radio access node 1200 includes one or more modules 1400, each of which is implemented in software. The module(s) 1400 provide the functionality of the radio access node 1200 described herein (e.g., one or more functions of a network node described herein in section II of the Detailed Description above). This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
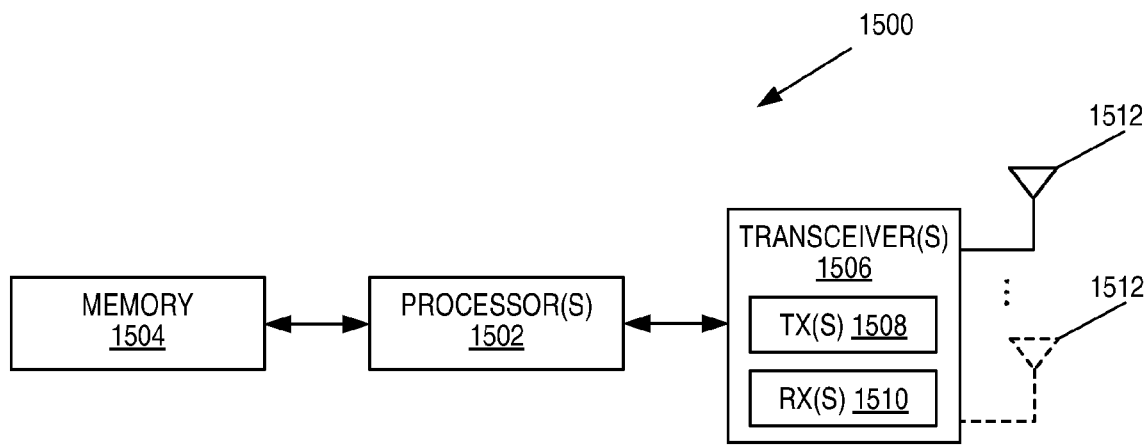
FIGS. 15 and 16 are schematic block diagrams of a wireless device (e.g., UE).

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the UE 1500 described above (e.g., one or more functions of a network node described herein in section I of the Detailed Description above) may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the embodiments described herein (e.g., one or more functions of a network node described herein in section I of the Detailed Description above) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
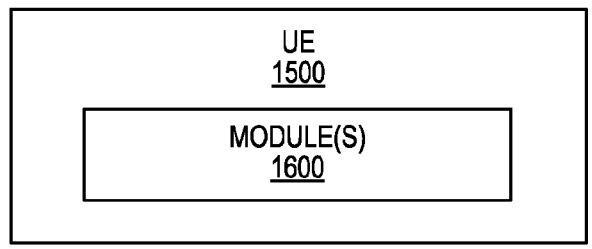

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein (e.g., one or more functions of a network node described herein in section I of the Detailed Description above).

With reference to FIG. 17, in accordance with an embodiment, a communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as NBs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the disclosed embodiments are equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Example implementations, in accordance with an embodiment, of the UE, base station, and host computer discussed in the preceding paragraphs will now be described with reference to FIG. 18. In a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAs, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both. While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings of the embodiments described throughout this disclosure. One or more of the various embodiments improve the performance of OTT services provided to the UE 1814 using the OTT connection 1816, in which the wireless connection 1826 forms the last segment.

A measurement procedure may be provided for the purpose of monitoring data rate, latency, and other factors on which the one or more embodiments improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1818, and it may be unknown or imperceptible to the base station 1818. Such procedures and functionalities may be known and practiced in the art. In certain embodiments, measurements may involve proprietary UE signaling facilitating the host computer 1802's measurements of throughput, propagation times, latency, and the like. The measurements may be implemented in that the software 1810 and 1840 causes messages to be transmitted, in particular empty or 'dummy' messages, using the OTT connection 1816 while it monitors propagation times, errors, etc.

FIG. 19 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings of the embodiments described throughout this disclosure. In step 1908 (which may also be optional), the UE executes a client application associated with the host application executed by the host computer.

FIG. 20 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings of the embodiments described throughout this disclosure. In step 2004 (which may be optional), the UE receives the user data carried in the transmission.

FIG. 21 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 21 will be included in this section. In step 2100 (which may be optional), the UE receives input data provided by the host computer. Additionally or alternatively, in step 2102, the UE provides user data. In sub-step 2104 (which may be optional) of step 2100, the UE provides the user data by executing a client application. In sub-step 2106 (which may be optional) of step 2102, the UE executes a client application which provides the user data in reaction to the received input data provided by the host computer. In providing the user data, the executed client application may further consider user input received from the user. Regardless of the specific manner in which the user data was provided, the UE initiates, in sub-step 2108 (which may be optional), transmission of the user data to the host computer. In step 2110 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 22 will be included in this section. In step 2200 (which may be optional), in accordance with the teachings of the embodiments described throughout this disclosure, the base station receives user data from the UE. In step 2202 (which may be optional), the base station initiates transmission of the received user data to the host computer. In step 2204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a wireless device comprising: performing and storing (1002) one or more dormant mode (e.g., idle mode or inactive mode) measurements; identifying (1006) a reporting scheme to be used by the wireless device to report dormant mode measurements; and report (1008) at least one of the stored dormant mode measurements in accordance with the identified reporting scheme.

Embodiment 2: The method of embodiment 1 wherein reporting (1008) the at least one of the stored dormant mode measurements comprises reporting (1008) the at least one of the stored dormant mode measurements in accordance with the identified reporting scheme in association with (e.g., during or following) a connection resume procedure.

Embodiment 3: The method of embodiment 1 or 2 wherein identifying (1006) the reporting scheme comprises identifying (1006) the reporting scheme from among a defined set of two or more reporting schemes for dormant mode measurements.

Embodiment 4: The method of embodiment 1 or 2 wherein identifying (1006) the reporting scheme comprises identifying (1006) the reporting scheme from among a defined set of two or more reporting schemes for dormant mode measurements based on an explicit indication received from a network node.

Embodiment 5: The method of embodiment 4 wherein the explicit indication is:
  an explicit indication broadcasted in system information,
  an explicit indication at Msg2 during a RRC connection resume procedure (e.g., in a RAR or in a MAC CE),
  an explicit indication in a message (e.g., an RRC Release like message),
  an explicit indication comprised in a measurement configuration(s) for the dormant mode measurements, or
  an explicit indication included or excluded during a transition of the wireless device from the dormant mode to a connected mode (e.g., in a RRC Resume, RRC Setup, or Paging like message).

Embodiment 6: The method of embodiment 1 or 2 wherein identifying (1006) the reporting scheme comprises identifying (1006) the reporting scheme from among a defined set of two or more reporting schemes for dormant mode measurements based on an implicit indication received from a network node.

Embodiment 7: The method of embodiment 6 wherein the implicit indication is: information that indicates whether short I-RNTI or full I-RNTI is to be used at connection resume, or a size of uplink grant(s) for Msg3 or Msg5.

Embodiment 8: The method of any one of embodiments 3 to 7 wherein the defined set of two or more reporting schemes for dormant mode measurements comprise at least one reporting scheme from the following group of reporting schemes: a reporting scheme in which dormant mode measurements are reported using Msg3 (e.g., in Msg3 or multiplexed with Msg3) during a RRC resume procedure; a reporting scheme in which dormant mode measurements are reported using Msg5 (e.g., in Msg5 or multiplexed with Msg5) during a RRC resume procedure; and a reporting scheme in which dormant mode measurements are reported using UEInformationRequest/Response.

Embodiment 9: The method any of the previous embodiments, further comprising: providing user data; and forwarding the user data to a host computer via the transmission to the base station.

Group B Embodiments

Embodiment 10: A method performed by a base station comprising: providing (1102), to a wireless device, information that indicates a reporting scheme to be used by the wireless device to report dormant mode measurements.

Embodiment 11: The method of embodiment 10 further comprising providing (1100), to the wireless device, one or more configurations for dormant mode measurements.

Embodiment 12: The method of embodiment 10 or 11 further comprising receiving (1104) one or more dormant mode measurements in accordance with the indicated reporting scheme.

Embodiment 13: The method of any one of embodiments 10 to 12 wherein the indicated reporting scheme is a reporting scheme in which the wireless device is to report dormant mode measurements in association with (e.g., during or following) a connection resume procedure.

Embodiment 14: The method of any one of embodiments 10 to 13 wherein the indication is an explicit indication of the reporting scheme to be used by the wireless device to report dormant mode measurements.

Embodiment 15: The method of embodiment 14 wherein the explicit indication is:
- an explicit indication broadcasted in system information,
- an explicit indication at Msg2 during a RRC connection resume procedure (e.g., in RAR or in a MAC CE),
- an explicit indication in a message (e.g., an RRC Release like message),
- an explicit indication comprised in a measurement configuration(s) for the dormant mode measurements, or
- an explicit indication included or excluded during a transition of the wireless device from the dormant mode to a connected mode (e.g., in a RRC Resume, RRC Setup, or Paging like message).

Embodiment 16: The method of any one of embodiments 10 to 13 wherein the indication is an implicit indication of the reporting scheme to be used by the wireless device to report dormant mode measurements.

Embodiment 17: The method of embodiment 16 wherein the implicit indication is: information that indicates whether short I-RNTI or full I-RNTI is to be used at connection resume, or a size of uplink grant(s) for Msg3 or Msg5.

Embodiment 18: The method of any one of embodiments 10 to 17 wherein the indicated reporting scheme is one of a defined set of two or more reporting schemes for dormant mode measurements.

Embodiment 19: The method of embodiment 18 wherein the defined set of two or more reporting schemes for dormant mode measurements comprise at least one reporting scheme from the following group of reporting schemes: a reporting scheme in which dormant mode measurements are reported using Msg3 (e.g., in Msg3 or multiplexed with Msg3) during a RRC resume procedure; a reporting scheme in which dormant mode measurements are reported using Msg5 (e.g., in Msg5 or multiplexed with Msg5) during a RRC resume procedure; and a reporting scheme in which dormant mode measurements are reported using UEInformationRequest/Response.

Embodiment 20: The method of any of the previous embodiments, further comprising: obtaining user data; and forwarding the user data to a host computer or a wireless device.

Group C Embodiments

Embodiment 21: A wireless device comprising: processing circuitry configured to perform any of the steps of any of the Group A embodiments; and power supply circuitry configured to supply power to the wireless device.

Embodiment 22: A base station comprising: processing circuitry configured to perform any of the steps of any of the Group B embodiments; and power supply circuitry configured to supply power to the base station.

Embodiment 23: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AP Access Point
AS Access Stratum
ASIC Application Specific Integrated Circuit
CA Carrier Aggregation
CE Control Element
CN Core Network
CPU Central Processing Unit
DC Dual Connectivity
DSP Digital Signal Processor
eLTE Enhanced Long Term Evolution
eNB Enhanced or Evolved Node B
EN-DC Evolved Universal Terrestrial Radio Access Network New Radio Dual Connectivity
EPC Evolved Packet Core
euCA Enhanced Carrier Aggregation utilization
E-UTRA Evolved Universal Terrestrial Radio Access
E-UTRAN Evolved Universal Terrestrial Radio Access Network
FPGA Field Programmable Gate Array
gNB New Radio Base Station
ID Identity
I-RNTI Inactive Radio Network Temporary Identifier
LTE Long Term Evolution
MAC Medium Access Control
MCG Master Cell Group
MeNB Master Enhanced or Evolved Node B
MME Mobility Management Entity
MR-DC Multi-Radio Dual Connectivity ms Millisecond
MTC Machine Type Communication
NE New Radio Evolved Universal Terrestrial Radio Access
NG-RAN Next Generation Radio Access Network
NR New Radio
OTT Over-the-Top
PCell Primary Cell
PCI Physical Cell Identity
P-GW Packet Data Network Gateway
PSCell Primary Secondary Cell
PUSCH Physical Uplink Shared Channel
RACH Random Access Channel
RAM Random Access Memory
RAN Radio Access Network
RAR Random Access Response
RAT Radio Access Technology
RLC Radio Link Control
ROM Read Only Memory
RRC Radio Resource Control
RRH Remote Radio Head
RRM Radio Resource Management
RSRP Reference Signal Received Power
RSRQ Reference Signal Received Quality
RTT Round Trip Time
SA Stand-Alone
SCEF Service Capability Exposure Function
SCell Secondary Cell
SCG Secondary Cell Group
SIB System Information Block
TM Transmission Mode
TS Technical Specification
TTI Transmit Time Interval
UE User Equipment Those skilled in the art will recognize improvements and modifications to the embodiments of the present disclosure. All such improvements and modifications are considered within the scope of the concepts disclosed herein.

What is claimed is:

1. A method performed by a wireless device, the method comprising:
    performing one or more dormant mode measurements, the one or more dormant mode measurements being one or more measurements performed by the wireless device while the wireless device is in a dormant mode;
    storing the one or more dormant mode measurements;
    receiving an implicit indication, from a network node, identifying a reporting scheme from among a defined set of two or more reporting schemes for dormant mode measurements to be used by the wireless device to report dormant mode measurements, the implicit indication being:
        information that indicates whether short Inactive Radio Network Temporary Identifier, I-RNTI, or full I-RNTI is to be used at connection resume; or
        a size of uplink grant(s) for msg3 or msg5, and
    the implicit indication identifying one of:
        a reporting scheme in which dormant mode measurements are reported with msg3 during a Radio Resource Control, RRC, resume procedure;
        a reporting scheme in which dormant mode measurements are reported with msg5 during the RRC resume procedure; and
        a reporting scheme in which dormant mode measurements are reported using UEInformationRequest/Response; and
    reporting at least one of the stored one or more dormant mode measurements in accordance with the identified reporting scheme based on the implicit indication received from the network node.

2. A wireless device, comprising:
    one or more transmitters;
    one or more receivers; and
    processing circuitry associated with the one or more transmitters and the one or more receivers, the processing circuitry configured to:
        perform one or more dormant mode measurements, the one or more dormant mode measurements being one or more measurements performed by the wireless device while the wireless device is in a dormant mode;
        store the one or more dormant mode measurements;
        receive an implicit indication identifying a reporting scheme from among a defined set of two or more reporting schemes for dormant mode measurements to be used by the wireless device to report dormant mode measurements, the implicit indication being:
            information that indicates whether short Inactive Radio Network Temporary Identifier, I-RNTI, or full I-RNTI is to be used at connection resume; or
            a size of uplink grant(s) for msg3 or msg5, and
        the implicit indication identifying one of:
            a reporting scheme in which dormant mode measurements are reported with msg3 during a Radio Resource Control, RRC, resume procedure;
            a reporting scheme in which dormant mode measurements are reported with msg5 during the RRC resume procedure; and
            a reporting scheme in which dormant mode measurements are reported using UEInformationRequest/Response; and
        report at least one of the stored one or more dormant mode measurements in accordance with the identified reporting scheme based on the implicit indication received from the network node.

3. A method performed by a base station, the method comprising:
    providing, to a wireless device, an implicit indication identifying a reporting scheme from among a defined set of two or more reporting schemes for dormant mode measurements to be used by the wireless device to report dormant mode measurements, the dormant mode measurements being one or more measurements performed by the wireless device while the wireless device is in a dormant mode, the implicit indication being:
        information that indicates whether short Inactive Radio Network Temporary Identifier, I-RNTI, or full I-RNTI is to be used at connection resume; or
        a size of uplink grant(s) for msg3 or msg5, and
    the implicit indication identifying one of:
        a reporting scheme in which dormant mode measurements are reported with msg3 during a Radio Resource Control, RRC, resume procedure;
        a reporting scheme in which dormant mode measurements are reported with msg5 during the RRC resume procedure; and
        a reporting scheme in which dormant mode measurements are reported using UEInformation Request/Response.

4. A base station, comprising:
processing circuitry configured to cause the base station to:
provide, to a wireless device, an implicit indication identifying a reporting scheme from among a defined set of two or more reporting schemes for dormant mode measurements to be used by the wireless device to report dormant mode measurements, the dormant mode measurements being one or more measurements performed by the wireless device while the wireless device is in a dormant mode, the implicit indication being:
- information that indicates whether short Inactive Radio Network Temporary Identifier, I-RNTI, or full I-RNTI is to be used at connection resume; or
- a size of uplink grant(s) for msg3 or msg5, and the implicit indication identifying one of:
- a reporting scheme in which dormant mode measurements are reported with msg3 during a Radio Resource Control, RRC, resume procedure;
- a reporting scheme in which dormant mode measurements are reported with msg5 during the RRC resume procedure; and
- a reporting scheme in which dormant mode measurements are reported using UEInformationRequest/Response.

\* \* \* \* \*